(12) United States Patent
Jiang

(10) Patent No.: US 12,163,527 B2
(45) Date of Patent: Dec. 10, 2024

(54) SWING ANGLE ADJUSTMENT DEVICE FOR ELECTRIC FAN OSCILLATING HEAD, AND ELECTRIC FAN APPLYING SAME

(71) Applicant: Liangjian Jiang, Guangzhou (CN)

(72) Inventor: Liangjian Jiang, Guangzhou (CN)

( * ) Notice: Subject to any disclaimer, the term of this patent is extended or adjusted under 35 U.S.C. 154(b) by 0 days.

(21) Appl. No.: 18/250,211

(22) PCT Filed: Jun. 16, 2021

(86) PCT No.: PCT/CN2021/100245
§ 371 (c)(1),
(2) Date: Apr. 23, 2023

(87) PCT Pub. No.: WO2022/088691
PCT Pub. Date: May 5, 2022

(65) Prior Publication Data
US 2023/0392604 A1 Dec. 7, 2023

(30) Foreign Application Priority Data

Oct. 26, 2020 (CN) .......................... 202011155032.0

(51) Int. Cl.
F04D 25/10 (2006.01)
F04D 27/00 (2006.01)
F04D 29/00 (2006.01)

(52) U.S. Cl.
CPC ........... F04D 25/105 (2013.01); F04D 27/00 (2013.01); F04D 29/002 (2013.01)

(58) Field of Classification Search
CPC ...... F04D 25/105; F04D 27/00; F04D 29/002; F04D 27/002; H02K 7/1166;
(Continued)

(56) References Cited

U.S. PATENT DOCUMENTS 6,468,036 B1 10/2002 Song

FOREIGN PATENT DOCUMENTS

| CN | 1072246 | 5/1993 |
| CN | 2378559 | 5/2000 |

(Continued)

*Primary Examiner* — Aaron R Eastman
(74) *Attorney, Agent, or Firm* — JMB Davis Ben-David

(57) ABSTRACT

Disclosed is a swing angle adjustment device for an electric fan oscillating head, and an electric fan applying same. By means of an arc reinforcing sleeve, in which one end is in sliding fit with a planetary gear addendum-circle surface and the other end is in clearance with a sun gear addendum-circle, being made on the lower end surface of a planet carrier, the swing angle adjustment device which is for an electric fan oscillating head and can prevent a planetary-gear crank from dislocation is constituted; by means of a small-diameter non-involute toothed ratchet wheel and a pawl being arranged on a large, a non-involute toothed ratchet wheel and pawl clutch device is formed, such that the swing angle adjustment device for an electric fan oscillating head is constituted in such a way that the clutch device has no slip under normal conditions; by means of a rotor position sensing signal acquisition device, in which high- and low-voltage elements are isolated from each other, being arranged, on a rotor of an electric motor, to connect to an angle adjustment control chip, a closed-loop electric-control-type swing angle adjustment device, in which angle adjustment is convenient, for an electric fan oscillating head is constituted; and by means of using a screw-free structure and a built-in layout for a bearing sleeve positioning plate, a magnetic attraction brake device, and components that are related to an electrical signal sampling system, the structure of the swing angle adjustment device is compact.

13 Claims, 15 Drawing Sheets

(58) Field of Classification Search
CPC .................. H02K 11/215; H02K 11/30; F05D 2260/4031; F05D 2260/903; Y02E 10/72
See application file for complete search history.

(56) References Cited

FOREIGN PATENT DOCUMENTS

| | | |
|---|---|---|
| CN | 1346022 | 4/2002 |
| CN | 1450270 | 10/2003 |
| CN | 2853741 | 1/2007 |
| CN | 1936339 | 3/2007 |
| CN | 202483962 | 10/2012 |
| CN | 206211897 | 5/2017 |
| CN | 109139520 | 1/2019 |
| CN | 208535113 U | 2/2019 |
| CN | 111255721 | 6/2020 |
| JP | 2001342990 | 12/2001 |

SWING ANGLE ADJUSTMENT DEVICE FOR ELECTRIC FAN OSCILLATING HEAD, AND ELECTRIC FAN APPLYING SAME

CROSS-REFERENCE TO RELATED APPLICATIONS

This is the US National Stage of International Patent Application No. PCT/CN2021/100245 filed Jun. 16, 2021, which claims priority to Chinese Patent Application 202011155032.0, filed Oct. 26, 2020.

FIELD OF THE INVENTION

The present disclosure relates to the technical field of fans, in particular to an oscillation angle adjustment device for a fan and a fan applying same.

BACKGROUND OF THE INVENTION

Chinese Patent Application No. 201710491195.8 discloses a fan oscillation angle adjustment device, which changes a range of a fan oscillation angle on the basis of manipulating the motion of a planetary gear train crank. The device includes a motor (an alternating current motor or a direct current motor), a plastic gearbox housing, and a set of power transmission mechanism including a worm, a worm gear, a small gear of axis-and-worm gear, and a large gear. A bearing sleeve positioning plate is arranged between the small gear of axis-and-worm gear and the large gear. A planetary gear train-crank mechanism composed of a sun gear, a planetary gear crank, a planetary frame and a planetary shaft is arranged at a lower end of a mandrel and a lower end of a hollow shaft. A large wheel-pawl clutch device is arranged at upper ends of the hollow shaft and the mandrel, and a control ratchet wheel is arranged above a pawl seat. A small cylinder is made on a pawl and passes through a via hole in the control ratchet wheel to constitute a clutch-brake control mechanism. A magnetic brake is arranged above a side wall of the plastic gearbox housing. The magnetic brake is connected to an output end of an angle adjustment control chip through a wire to form an electrically controlled fan oscillation angle adjustment device. A permanent magnet is arranged on a rotor of the motor (the alternating current motor or the direct current motor), and a rotor position sensing signal acquisition device is arranged in a corresponding clearance of the permanent magnet. The rotor position sensing signal acquisition device is connected to an input end of the angle adjustment control chip through a wire, to form a group of non-contact electrical signal sampling device. During angle adjustment, the electrical signal sampling device transmits, to an angle adjustment control chip comparator, real-time sampled electrical signal data corresponding to a variable-length gyration motion trajectory of the planetary gear crank, and sends an instruction through difference calculation. The control ratchet wheel is braked by a brake pad of the magnetic brake to control engagement and disengagement of the clutch device, and the planetary gear crank is driven to rotate to make corresponding changes, so that an oscillation angle of the fan is also correspondingly adjusted, thereby forming a closed-loop electrically controlled oscillation angle adjustment device for a fan, which is convenient for angle adjustment. This device has the characteristics that sampled electrical signals are stable, the resolution is high, and the sampling device has long working life. However, in the implementation, application, and production of the oscillation angle adjustment device for a fan, there are still the following shortcomings:

1. The planetary gear train-crank mechanism in the prior art is a single-ended cantilever structure. A combined force of an external axial force of the sun gear to the planetary gear crank and a push and pull force of a connecting rod of a fan oscillation mechanism to a cantilever at a far end of the planetary gear crank seriously affects the engagement stability of the planetary gear crank and the sun gear. Dislocation, runout, wear, and noise may occur between the planetary gear crank and the sun gear during operation. In a factory locked-rotor test or in use, an external force blocking impact will cause the dislocation between the planetary gear crank and the sun gear, resulting in offset misalignment of the planetary gear crank from an original assembly reference origin, leading to a misalignment of an oscillation angle control system and a failure of angle adjustment.

In order to prevent the dislocation between the planetary gear crank and the sun gear during engagement, there was a technology that disclosed a planetary gear train oscillation angle adjustment and enhancement device in specification of Chinese patent No. 02115054.0. This device has the characteristics that "a circular arc reinforcing sleeve is made in a lower section wall of the planetary gear train reinforcing frame along non-meshed portions of addendum circle surfaces of a planetary gear and a sun gear. A center distance of circular arcs at both ends of the circular arc reinforcing sleeve is equal to an engagement center distance between the planetary gear and the sun gear. A circular surface of the circular arc reinforcing sleeve is in a dynamic fit with the corresponding addendum circle surfaces of the planetary gear and the sun gear" (see lines 2-6 on page 4 of the specification). After this circular arc reinforcing sleeve is added, the engagement stability of the planetary gear crank and the sun gear is improved. However, the new setting "a circular arc reinforcing sleeve is made along non-meshed portions of addendum circle surfaces of a planetary gear and a sun gear" is structurally an internal limit type fastening structure. During operation, the combined force of the external axial force of the sun gear to the planetary gear crank and the push and pull force of the connecting rod of the fan oscillation mechanism to the cantilever at the far end of the planetary gear crank cannot be released under the internal limit type restriction of the circular surfaces at the two ends of the circular arc reinforcing sleeve. As a result, teeth of the planetary gear and the sun gear generate an extremely high extrusion force and addendum pressure intensity on the circular surface of the inner wall of the circular arc reinforcing sleeve. Furthermore, due to the fact "a center distance of circular arcs at both ends of the circular arc reinforcing sleeve is equal to an engagement center distance between the planetary gear and the sun gear", clearance-free movement between the three components causes the teeth of the planetary gear and the sun gear to generate overload extrusion deformation friction, thereby affecting the operation efficiency and service life of the planetary gear train-crank mechanism. In addition, after the clutch device is turned on during the angle adjustment, the control ratchet wheel brakes the sun gear below the mandrel, so that the operation of the three components of the planetary gear train-crank mechanism is in a transmission state, in which the sun gear below the mandrel is locked, power of the motor is input by the hollow shaft to make the planetary frame spin, and the planetary gear crank gyrates (revolve and rotate) to output power. At this time, the fixed circular arc reinforcing sleeves are added at the two ends of tooth circles of the planetary gear and the sun gear, instead of a movable gear ring that is one of the three components of the traditional planetary gear train mechanism. In this way, a friction brake effect is achieved on the addendums of the planetary gear and the sun gear, which significantly increases and additionally consumes the power input by the motor via the hollow shaft, and further causes restraining impact and extrusion damage between the three components of the planetary gear train-crank mechanism. In addition, this solution also includes "a positioning shaft that can be assembled with a bearing is arranged at the lower section of the planetary gear; a bearing fixing plate is arranged below the planetary gear train reinforcing frame; a positioning bearing is arranged at a concentric position of the fixing plate corresponding to the positioning shaft; and the positioning shaft is concentrically arranged in the positioning bearing for dynamic fit", and two screws (see the specification and attached drawings), so that the device has the disadvantages of complex structure, a large number of parts, difficult assembling and high cost.

Obviously, the aforementioned disadvantages of the planetary gear train-crank mechanism in the prior art and the related art need to be improved.

2. In the large gear-pawl clutch device in the prior art, the large gear is a meshing type power transmission component in a power transmission mechanism, and its tooth profile needs to be involute. When it is necessary to arrange another pawl on an outer side of the large gear to press the involute teeth by a bias spring, a group of large gear-pawl clutch device is formed. This involute tooth profile in the clutch device has a structural disadvantage of a relatively low bearing load. When there is a high load in the use of the fan or the fan is slightly blocked, an unloading slip dislocation phenomenon will be caused between the large gear and the pawl. As a result, offset misalignment also occurs in the planetary gear crank, leading to a failure of angle adjustment control.

3. In the power transmission mechanism including the worm, the worm gear, the small gear of axis-and-worm gear, and the large gear in the prior art, a bearing sleeve positioning plate is arranged between the small gear of axis-and-worm gear and the large gear; the bearing sleeve positioning plate is fixedly arranged on a stud of a plastic gearbox in a screwing manner, to form a set of non-slip power transmission mechanism. This is a production technology most widely used in an oscillation gearbox of a fan. However, this screwing technology not only requires a screw, but also requires an operator to hold an electric screwdriver with one hand and to place the bearing sleeve positioning plate with the other hand. The operator needs to pick up a screw, place the screw, align the screw, and drive the screw into a stud to complete the installation. If the screw falls onto the ground or falls into the gearbox housing carelessly, the operator needs to pick up the screw and perform the aforementioned actions again. In addition, the screw will be occasionally left in a gearbox finished product. After delivery, there will be a potential hazard of a quality accident during general assembling of a fan. This technology of screwing the bearing sleeve positioning plate, which wastes screws and time, and relevant structures need to be optimized.

4. The magnetic brake in the prior art is fixedly arranged on a side wall of the gearbox housing in a screwing manner. This screwing manner has the characteristics of reliable mounting and convenient maintenance, disassembling and replacement. However, a volume space for mounting the magnetic brake on the side wall of the gearbox housing greatly exceeds a conventional volume space of a traditional gearbox, making it difficult to cover and protect the magnetic brake with a cover plate, which does not comply with the requirements of the safety regulation for fans. On the other hand, this production technology for fixing the magnetic absorption brake device to the gearbox housing in the screwing manner is a waste of time and labor and occupies the space of the gearbox, so it needs to be optimized and improved.

5. The gearbox product in the prior art has an extremely large volume, and no cover plate is arranged for the gearbox housing, so that all parts are exposed from the gearbox housing, which violates the requirements of the safety regulation of the fan manufacturing industry. Furthermore, the mounting form, the packing specification, and the acceptance criteria for delivery of the fully exposed gearbox and the operation method of the assembly line of the whole factory all do not comply with the regulations in the fan industry, so that it is hard to assemble this gearbox with the conventional production technology in many fan factories. This also needs to be further structurally optimized and improved.

6. Most fans on the market at present are alternating current fans, including alternating current motors that use 220v or 110v (outside China) alternating current. In the technical solution with the alternating current motor of the prior art, a Hall sensor is mounted in a metal housing of the alternating current motor. The alternating current motor is a high-voltage element. The Hall sensor is a DC 5v low-voltage weak-current element, forming a mixed installation of low- and high-voltage elements in the motor housing. This causes a phenomenon of excessive breakdown and low yield of the Hall sensor. In addition, during assembling and production, there are problems such as complex operation process for the low- and high-voltage alternating current and direct current motor, incompatibility with conventional production equipment and processes in existing fan factories, slow assembling, excessive secondary breakdown, difficulty in disassembling, assembling and repair, and high product rejection rate.

For the problems of excessive breakdown and low yield caused by the mixed installation of the low- and high-voltage elements in the hall sensor that is mounted in the housing of the alternating current motor in the prior art, the specification of Chinese patent application No. 201811483376.7 in the subsequent technology discloses a non-contact oscillation angle adjustment electrical signal sampling device for a fan, in which a magnetic ring of a permanent magnet is mounted on a rotor shaft body, extending out of a housing, of a rotor of the alternating current motor, the hall sensor is correspondingly mounted in a plastic gearbox housing, and a set of low- and high-voltage elements are isolated, so that the problems caused by the mixed installation of the low- and high-voltage elements can be avoided. However, under the impact of the characteristics of a centrifugal force and a thermal expansion and cold contraction stress generated on a surface of the rotor shaft body caused by high-speed rotation of the rotor of the alternating current motor, in this subsequent technical solution, a specific method for mounting the magnetic ring of the permanent magnet on the rotor shaft body, extending out of the housing, of the rotor of the alternating current motor and the structure shown in FIG. 2 of the specification cannot adopt either an inlaying process or an adhesion process, but only uses an injection molding process: First, a motor shaft and a permanent magnet material are put into an injection molding machine for integrated hot-press molding. The motor shaft that has been thermally molded and fixedly provided with the magnetic ring of the permanent magnet is then pressed into a rotor core. A motor front-housing bearing, a gasket and a stator are arranged from a front end of the rotor shaft. A rear gasket and a motor rear-housing bearing are arranged from a rear end of the rotor shaft. At this time, due to the radial obstruction of the magnetic ring of the permanent magnet that has been thermally formed and fixed on the rear shaft body of the rotor shaft, parts such as the rear-housing bearing of the alternating current motor cannot pass through the magnetic ring of the permanent magnet on the rear shaft body of the rotor shaft, so that a complete alternating current motor cannot be assembled. Obviously, the fixing structure and injection molding process for the magnetic ring of the permanent magnet in the above subsequent technology have the defect of interference with the conventional alternating current motor mounting process, so that they need to be improved. Otherwise, the corresponding position conditions for mounting the Hall sensor in the plastic gearbox housing and isolating a group of low- and high-voltage elements will not be satisfied.

SUMMARY OF THE INVENTION

To solve the technical problems, the present disclosure provides an oscillation angle adjustment device for a fan and a fan applying same, which can overcome the shortcomings of easy dislocation and large extrusion deformation friction of a planetary gear train-crank mechanism, can improve an effective load of a clutch device to avoid slip and misalignment, can fixedly mount a magnetic ring of a permanent magnet on a rotor shaft body outside a housing of an alternating current motor to change a mixed installation layout of low- and high-voltage elements of a hall sensor, can make the structure of a product compact and provide complete housing cover plate protection, is easy to mount and low in cost, and can comply with the safety regulations and meet the industry regulations of a fan industry.

In order to solve the above technical problems, the present disclosure provides an oscillation angle adjustment device for a fan and a fan applying same. The oscillation angle adjustment device for a fan includes a motor (an alternating current motor a direct current motor), a plastic gearbox housing, and a set of power transmission mechanism including a worm, a worm gear, a small gear of axis-and-worm gear and a large gear; a bearing sleeve positioning plate is arranged between the small gear of axis-and-worm gear and the large gear; a first inverted clasp and a second inverted clasp are arranged at a position of a bottom of the plastic gearbox housing corresponding to an outer side of an addendum circle of the worm gear; a first clasp hole and a second clasp hole are arranged at a position of the bearing sleeve positioning plate corresponding to the outer side of an addendum circle of the worm gear; and the inverted clasps at the bottom of the plastic gearbox housing are pressed into the clasp holes of the bearing sleeve positioning plate to achieve inverted clasp-clasp hole fastening. Thus, a set of power transmission mechanism that is fixedly mounted in a screw-free manner is formed in the oscillation angle adjustment device for a fan of the present disclosure. The screw-free inverted clasp-clasp hole fixing manner is used for the bearing sleeve positioning plate of the power transmission mechanism to replace a screwing fixing technology in the prior art, so that screws are saved. During mounting, no tools are used. An operator presses the bearing sleeve positioning plate to the inverted clasps with hands to complete fixing, which improves the working efficiency. More importantly, this essentially eliminates a potential hazard of a quality accident caused during general assembling of a fan after delivery because screws are occasionally left in a gearbox finished product.

A set of planetary gear train-crank mechanism composed of a sun gear, a plenary gear crank, a planetary frame and a planetary shaft is arranged at a lower end of a mandrel and a lower end of a hollow shaft; a circular arc reinforcing sleeve is integrated on a lower end face of the planetary frame; a circular surface of one end of the circular arc reinforcing sleeve is in sliding fit with a non-meshing portion of an addendum circle surface of the planetary gear; and another end of the circular arc reinforcing sleeve keeps a space with an addendum circle of the sun gear.

By means of the circular surface of one end of the circular arc reinforcing sleeve integrated on the lower end face of the planetary frame being in sliding fit with the planetary gear, and another end keeping a space with the sun gear, on the one hand, the semi-closed circular surface of one end of the circular arc reinforcing sleeve can be used to restrain a single-ended cantilever structure of the planetary gear crank, to avoid dislocation. On the other hand, the addendum circle of the sun gear is kept in an open clearance from another end of the circular arc reinforcing sleeve, so that restricted extrusion damage from the planetary gear to the sun gear in the angle adjustment process is structurally eliminated, and the problem of braking of the sun gear caused by the gyration of the planetary frame and the circular arc reinforcing sleeve is eliminated. Thus, a set of planetary gear train-crank mechanism in the oscillation angle adjustment device for a fan of the present disclosure is formed, which can eliminate reactive power loss during the angle adjustment, prolong the service lives of the three components of the planetary gear train-crank mechanism, and solve the problem of dislocation and slip of the single-ended cantilever structure of the planetary gear crank.

As a preferable structure of the planetary gear train-crank mechanism in the present disclosure, a gap is formed in a lower end of the hollow shaft; a bump is formed on a wall body of a hollow shaft sleeve hole of the planetary frame; wall surfaces of two sides of the bump are fixedly clamped into the gap of the hollow shaft; an arc radial wall surface of the bump passes through the gap in the lower end of the hollow shaft to be in sliding fit with a body of the mandrel. By means of the arc wall surface of the bump of the planetary frame passing through the gap in the lower end of the hollow shaft to be in sliding fit with the body of the mandrel, the convenience of fixing the planetary frame and the hollow shaft is improved; the stability of contact with the circular surface during the gyration of the planetary frame around the mandrel in the angle adjustment process is also improved; a friction force of large-area gyration of the hollow shaft and the mandrel is also reduced; the reactive power consumption is reduced; and the service lives of the relevant components are prolonged.

As a preferable structure of the planetary gear train-crank mechanism in the present disclosure, the planetary shaft is a rivet; a counterbore is formed in a lower end surface of a planetary gear shaft hole of the planetary gear crank; a diameter of the counterbore is greater than that of a head of the rivet, and a sinking depth of the counterbore is greater than a thickness of the head of the rivet; a diameter of a planetary shaft hole formed in the planetary frame is less than that of a body of the rivet; the body of the rivet passes through the counterbore of the planetary gear and the planetary gear shaft hole in a sliding fit manner, and is then pressed into the planetary shaft hole of the planetary frame in an interference fit manner to achieve fastening; and after fastening, a cascade end surface of the head of the rivet and a bottom end surface of the counterbore of the planetary gear are in sliding fit. By means of using a straight fixing solution of the rivet to replace a two-stage planetary shaft fixing solution in the prior art and a composite bearing fixing solution in the related art, the material cost is reduced; the assembling technology is optimized; the production efficiency is improved; and the labor and material cost of the components of the planetary gear train-crank mechanism in the present disclosure is reduced.

As a preferable structure of the planetary gear train-crank mechanism in the present disclosure, a longitudinal reference convex bar is arranged on an outer wall of the circular arc reinforcing sleeve; a longitudinal zero-setting convex bar is arranged on a crank body of the planetary gear crank; and when an eccentric distance of the planetary gear crank is located at a reference origin closest to a center distance of the sun gear, the longitudinal zero-setting convex bar of the planetary gear crank is longitudinally linearly aligned with the longitudinal reference convex bar of the circular arc reinforcing sleeve. By the adoption of a zero-setting device of the planetary gear train-crank mechanism, the operation accuracy, reliability and convenience of the whole set of planetary gear train-crank mechanism in the present disclosure in the whole process of production, quality inspection and repair can be improved.

A pawl seat, a pawl and a bias spring are arranged at an upper end of the mandrel; the large gear is arranged at an upper end of the hollow shaft; a ratchet wheel is concentrically integrated on an upper end face of the large gear, and an addendum circle of the ratchet wheel is smaller than an addendum circle of the large gear; a profile of teeth of the ratchet wheel is a non-involute tooth profile having a pressure angle greater than 30 degrees; and a cross section of a tooth is triangular, trapezoid or rectangular, or is of other non-involute shapes convenient for machining; and the pawl abuts against the teeth of the ratchet wheel with the non-involute tooth profile, to form a set of ratchet wheel-pawl clutch device. By means of rearranging the ratchet wheel-pawl clutch device, which has a pressure angle of greater than 30 degrees and has a non-involute tooth profile, on the upper end face of the large gear, an effective load of the ratchet wheel-pawl clutch device is much greater than that of a large gear-pawl clutch device which has a pressure angle of 0-25 degrees only and has an involute tooth profile. Furthermore, a larger pressure angle indicates a higher effective load. In this way, the structural disadvantages of low effective load and easy slip of the large gear-pawl clutch device in the prior art can be overcome, thus forming a set of clutch device that does not slip in a normal case.

A control ratchet wheel is arranged above the pawl seat; a via hole is formed in the control ratchet wheel; a small cylinder is arranged on the pawl and can pass through the via hole of the control ratchet wheel; a set of magnetic brake with a brake ratchet is arranged on an outer edge of the control ratchet wheel; and the magnetic brake device is connected to an output end of an angle adjustment control chip of a main control board through a wire, thus forming a set of electrically controlled clutch-brake operation mechanism.

The plastic gearbox housing forms a longitudinal open slot at a bottom, located on another side of a middle line of the worm, of the power transmission mechanism including the worm, the worm gear, the small gear of axis-and-worm gear and the large gear; a longitudinal mounting plate is formed at the bottom of the magnetic brake; the longitudinal mounting plate of the magnetic brake is inserted into the longitudinal open slot of the plastic gearbox housing to achieve close contact, so that the magnetic brake is plugged into the plastic gearbox housing in a hidden manner; an inverted buckle is arranged on a side wall of the longitudinal open slot; a through hole is formed in the longitudinal mounting plate; and the through hole of the longitudinal mounting plate is inserted into the longitudinal open slot along with the longitudinal mounting plate to achieve inverted buckle-through hole clamping contact with the inverted buckle on the side wall of the longitudinal open slot. Thus, the magnetic brake can be fixed in the plastic gearbox housing with bare hands, without screws and tools. On the one hand, the labor and material cost of the conventional screwing technology for mounting the magnetic brake in the prior art and the potential hazard that screws are left in a gearbox can be eliminated. On the other hand, according to the optimized structure, the magnetic brake is arranged at the bottom opposite to the plastic gearbox housing in the hidden manner, instead of being mounted on the side wall of the gearbox housing, so that the assembling space is reduced, and the violation defect that the magnetic brake is exposed from the side wall of the gearbox housing is avoided.

In order to facilitate machining and repair of the magnetic brake, the through hole of the longitudinal mounting plate of the above magnetic brake is a round through hole, and the inverted buckle on the side wall of the longitudinal open slot of the above plastic gearbox housing is a round inverted buckle. An extension plate is formed at a lower end of the round inverted buckle and extends out of the bottom end face of the longitudinal open slot. By adoption of the round through hole-round inverted buckle-extension plate structure, it is convenient to fix the magnetic brake with only hands. When the magnetic brake needs to be removed, no driver tool is used, and an operator can slightly press the extension plate with a finger to press the round inverted buckle away from the round through hole of the longitudinal mounting plate, to push the magnetic brake out, which is convenient for repair.

Further, a support-inverted clasp is arranged at a position of the plastic gearbox housing close to an outgoing line of the magnetic brake; the outgoing line of the magnetic brake is connected to a magnetic trunking circuit board and is connected with a magnetic trunking socket on the board; a fourth clasp hole and a fifth clasp hole are formed in the magnetic trunking circuit board; the fourth clasp hole and the fifth clasp hole of the magnetic trunking circuit board are pressed into the support-inverted clasp of the plastic gearbox housing to achieve inverted clasp-clasp hole fastening; a wire of the angle adjustment control chip is provided with a magnetic trunking plug; and the magnetic trunking plug is connected to the magnetic trunking socket in a trunking plugging manner. By means of the outgoing line of the magnetic brake being connected to the magnetic trunking circuit board and the magnetic trunking socket, the magnetic brake is fixed in the plastic gearbox housing in an inverted clasp-clasp hole screw-free manner, so that an electrical control system is compact in configuration and convenient to mount, thereby forming a set of electrically controlled clutch-brake operation mechanism that complies with the production and operation regulations in the fan industry.

A main power motor for air blowing and oscillation of the existing fan can be an alternating current motor or a direct current permanent magnet brushless motor. Due to different types of main power motors of the fan, an electrical signal sampling system in the oscillation angle adjustment device for a fan separately adopts a corresponding electrical signal sampling system of the alternating current motor or a corresponding electrical signal sampling system of the direct current permanent magnet brushless motor.

When the main power motor of the fan is an alternating current motor, in the corresponding electrical signal sampling system of the alternating current motor, the motor is an alternating current motor. A planar gap is axially formed in a rotor shaft body, extending out of a housing of the motor, of the rotor of the alternating current motor; the permanent magnet is a magnetic sheet; a plastic lantern ring is arranged between the rotor shaft body extending out of the housing of the motor and the magnetic sheet; a magnet sleeving box is arranged on an outer wall of the plastic lantern ring; a third inverted clasp is arranged at an inlet of the magnet sleeving box; the magnetic sheet presses, from the inlet of the magnet sleeving box, the third inverted clasp to be inserted into the magnet sleeving box, to achieve fastening with the third inverted clasp, to form a set of magnetic sheet-plastic lantern ring assembling unit; at least two or more circular arc convex bars are arranged on an inner wall of the plastic lantern ring; circular surfaces of the circular arc convex bars are in sliding fit and contact with the rotor shaft body extending out of the housing of the motor; a transverse clamping type clasp bump is axially arranged on a wall body of the plastic lantern ring; and the transverse clamping type clasp bump slides into the planar gap of the rotor shaft body along with the plastic lantern ring to achieve transverse clamping and fixing.

The magnetic sheet is plugged into the magnet sleeving box of the plastic lantern ring to form a set of elastic magnetic sheet-plastic lantern ring assembling unit, so that the assembling unit can sleeve a rotor shaft body in a sliding manner from a rear end of the rotor shaft body of the alternating current motor extending out of the housing. Furthermore, the transverse clamping type clasp bump on the wall body of the plastic lantern ring is used to be clamped to the gap structure of the rotor shaft body, which solves an assembling problem: Since the rotor of the alternating current motor rotates at a high speed, a centrifugal force generated on a surface of the rotor shaft body and the characteristic of a thermal expansion and cold contraction stress cause the magnetic sheet to move and even fly out. This screw-free and glue-free sliding-mounting method is compatible with the industrial production technology and has the advantages of high efficiency and low cost. Therefore, sleeving the rotor shaft body of the alternating current motor extending out of the housing by the magnetic sheet-plastic lantern ring assembling unit establishes a basis for low- and high-voltage isolation of a hall sensor.

In the corresponding electrical signal sampling system of the alternating current motor used in the present disclosure, the rotor position sensing signal acquisition device is a hall sensor; the hall sensor is mounted on an electrical signal trunking circuit board and is connected to an electrical signal trunking socket fixedly arranged to the electrical signal trunking circuit board; a third clasp hole is formed in a side edge of the electrical signal trunking circuit board; a longitudinal clamping plate slot, a clamping plate bar and a baffle plate-inverted clasp are arranged in the plastic gearbox housing; the electrical signal trunking circuit board and the third clasp hole thereof are plugged into the longitudinal clamping plate slot, the clamping plate bar and the baffle plate-inverted clasp of the plastic gearbox housing from top to bottom, to achieve inverted clasp-clasp hole plugged fastening and fixing; after plugging and fixing, the hall sensor on the electrical signal trunking circuit board is located in the plastic gearbox housing, and corresponds to a radial clearance at the magnetic sheet position of the magnetic sheet-plastic lantern ring assembling unit on the gap of the rotor shaft body, extending out of the housing, of the alternating current motor; a wire of the angle adjustment control chip is provided with an electrical signal trunking plug; and the electrical signal trunking plug is connected to the electrical signal trunking socket in a trunking plugging manner. By such a structure, the hall sensor can be arranged in the plastic gearbox housing that isolates a high-voltage environment, thus forming a set of electrical signal sampling device of the alternating current motor, in which low- and high-voltage elements are isolated. The electrical signal trunking plug arranged on the wire of the angle adjustment control chip is connected to the electrical signal trunking socket in the trunking plugging manner, to form the electrical signal sampling system of the alternating current motor of the present disclosure. The system is compatible with the industrial mounting technology.

In the angle adjustment process, the electrical signal sampling system of the alternating current motor inputs a real-time detected electrical signal sampling value associated with and corresponding to a gyration action trajectory of the planetary gear crank into the angle adjustment control chip. By calculation, the magnetic brake is controlled to be energized to be closed, and the brake ratchet blocks the control ratchet wheel; the ratchet wheel-pawl clutch device is turned on to drive the planetary gear crank to gyrate to enter an angle adjustment state; when a difference between the electrical signal sampling value and a given value is zero, the angle adjustment control chip sends a power-off instruction; the brake ratchet of the magnetic brake releases the control ratchet wheel, and the clutch device is closed; and the planetary gear train-crank is locked into an ordinary gear train according to a new set value. Thus, the alternating current fan oscillates to blow air according to a new oscillation angle range, to form the closed-loop electrically controlled oscillation angle adjustment device of the alternating current fan.

A cover plate is arranged on the plastic gearbox housing; the cover plate forms a first opening and a second opening in positions corresponding to the magnetic trunking socket and the electrical signal trunking socket; and the cover plate covers all components in the plastic gearbox housing, to achieve fastening combination with the plastic gearbox housing. In such a fastening manner by the cover plate structure reserved with the openings, a complete housing protection can be provided for the oscillation angle adjustment device product of a fan, which complies with the safety regulations and meets the industry regulations.

When the main power motor of the fan is the direct current permanent magnet brushless motor, in the oscillation angle adjustment device for a fan of the present disclosure, the remaining mechanisms are basically the same except that the corresponding electrical signal sampling system of the direct current permanent magnet brushless motor is different from the electrical signal sampling system of the alternating current fan. In the electrical signal sampling system of the direct current permanent magnet brushless motor of the present disclosure, the above motor is the direct current permanent magnet brushless motor; the above permanent magnet is an existing permanent magnet of the rotor of the direct current permanent magnet brushless motor; the above rotor position sensing signal acquisition device is an existing hall sensor or an existing positionless sensing technology device of the direct current permanent magnet brushless motor; and an existing electrical signal wire of the hall sensor or an existing electrical signal wire of the positionless sensing technology device is connected to the input end of the angle adjustment control chip via the wire. In this way, the electrical signal sampling system of the direct current permanent magnet brushless motor in the present disclosure can be formed as long as one connecting line connected to the input end of the angle adjustment control chip is additionally arranged at an output end of the electrical signal wire of the existing rotor position sensing signal acquisition device of the direct current permanent magnet brushless motor. It can be understood that in order to avoid the interference caused by repeated arrangement, no planar gap will be formed in the rotor shaft body of the direct current permanent magnet brushless motor extending out of the housing, and the magnetic sheet-plastic lantern ring assembling unit will not be required either. A space is reserved in the longitudinal clamping plate slot, the clamping plate bar and the baffle plate-inverted clasp of the above plastic gearbox housing, and the electrical trunking circuit board, and the hall sensor and the electrical trunking socket on the board are not plugged; and no electrical signal trunking socket opening will not be formed in the cover plate. Therefore, the electrical signal sampling system of the direct current permanent magnet brushless motor is connected to the input end of the angle adjustment control chip, and the output end of the angle adjustment control chip is connected to the magnetic brake, to form a closed-loop electrically controlled oscillation angle adjustment device for a fan with a direct current permanent magnet brushless motor, so that the planetary gear crank can be operated to be adjusted according to a new set value to achieve automatic adjustment of an oscillation angle of a direct current fan. The adjustment path and principle of the closed-loop electrically controlled planetary gear train-crank have been described in the technical solution of the alternating current fan, and will not be repeated here.

In conclusion, compared with the prior art, the present disclosure has the following beneficial effects:

1. The circular arc reinforcing sleeve, in which one end is in sliding fit with the addendum circle surface of the planetary gear and another end keeps a space with the addendum circle of the sun gear, is arranged on the lower end face of the planetary frame, to form a set of oscillation angle adjustment device for a fan that can avoid dislocation of the planetary gear crank.

2. The small-diameter non-involute-tooth ratchet wheel and the pawl are arranged on the large gear to form a set of non-involute-tooth ratchet wheel-pawl clutch device, to form a set of oscillation angle adjustment device for a fan, in which the clutch device will not slip under a normal condition.

3. The rotor position sensing signal acquisition device, in which the low- and high-voltage elements are isolated, is arranged on the rotor of the motor and is connected to the angle adjustment control chip, to form a closed-loop electrically controlled oscillation angle adjustment device for a fan that eliminates a breakdown phenomenon and is convenient for angle adjustment.

4. The bearing sleeve positioning plate, the magnetic brake and the relevant components of the electrical signal sampling system adopt screw-free structures and a hidden layout, so that the entire oscillation angle adjustment device for a fan has a compact structure, complies with the safety regulations and the industry regulations, and is suitable for being used in various angle adjustment fans.

BRIEF DESCRIPTION OF THE DRAWINGS

The above and/or additional aspects and advantages of the present disclosure will become apparent and easily understood from the description of embodiments in conjunction with the drawings attached below.

REFERENCE NUMERALS

Figure 1:
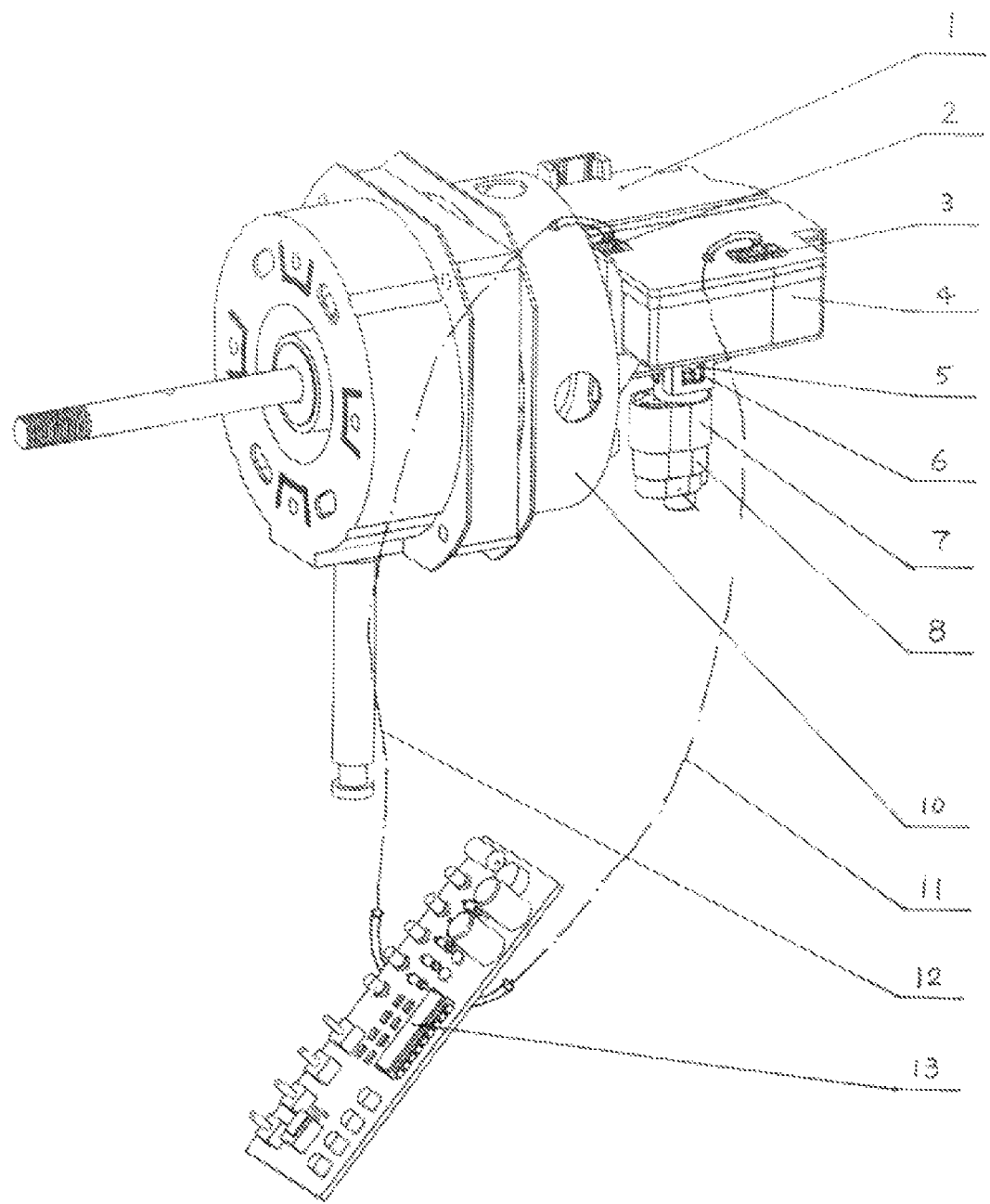
FIG. 1 is a schematic diagram of general arrangement of an alternating current fan embodiment of an oscillation angle adjustment device for a fan of the present disclosure.

1: cover plate; 2: electrical signal trunking plug; 3: magnetic trunking plug; 4: plastic gearbox housing; 5: longitudinal mounting plate; 6: longitudinal open slot; 7: planetary frame; 8: circular arc reinforcing sleeve; 9: planetary gear; 10: alternating current motor; 11: wire; 12: wire of the angle adjustment control chip; 13: angle adjustment control chip; 14: first opening; first clasp hole; 16: second opening; 17: bearing sleeve positioning plate; 18: second clasp hole; 19: electrical signal trunking socket; 20: magnetic trunking socket; 21: magnetic trunking circuit board; 22: brake ratchet; 23: outgoing line of the magnetic brake; 24: magnetic brake; 25: through hole; 27: worm gear; 28: small gear of worm gear shaft; 29: planetary shaft hole; 30: bump; 31: mandrel; 32: large gear; 33: ratchet wheel; 34: pawl; 35: bias spring; 36: small cylinder; 37: pawl seat; 38: via hole; 39: control ratchet wheel; 40: third clasp hole; 41: electrical signal trunking circuit board; 42: hollow shaft; 43: gap; 44: first inverted clasp; 45: planetary gear shaft hole; 46: sun gear; 47: rivet; 48: second inverted clasp; fourth clasp hole; 51: fifth clasp hole; 53: clamping plate bar; 54: clamping plate slot; 55: another end of the circular arc reinforcing sleeve; 56: counterbore; 57: head of rivet; 58: circular surface of one end of the circular arc reinforcing sleeve; 59: radial wall surface; 60: longitudinal reference convex bar; 61: longitudinal zero-setting convex bar; 63: tooth; 64: side wall of the longitudinal open slot; 65: inverted buckle; 66: extension plate; 67: plastic lantern ring; 68: circular arc convex bar; 69: magnet sleeving box; 70: third inverted clasp; 71: magnetic sheet; 72: transverse clamping type clasp bump; 73: rotor shaft body; 74: hall sensor; planar gap; 76: housing; 77: 12v direct current permanent magnet brushless motor; 79: electrical signal wire; 81: existing hall sensor of the 12v direct current permanent magnet brushless motor; and 84: permanent magnet.

DETAILED DESCRIPTION OF THE EMBODIMENTS

The embodiments of the present disclosure are described in detail below with reference to FIG. 1 to FIG. 18. Examples of the embodiments are shown in the accompanying drawings. The same or similar reference numerals represent the same or similar elements or elements having the same or similar functions throughout. The embodiments described below with reference to the drawings are exemplary, and are only intended to explain the present invention, and should not be construed as limiting the present invention.

In the description of the present disclosure, it should be understood that orientations or positional relationships indicated by the terms "center", "middle", "longitudinal", "transverse", "length" "width", "thickness", "upper", "lower", "front", "rear", "left", "right", "vertical", "horizontal", "top", "bottom", "inside", "outside", "axial", "radial", "circumferential" and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are not construed as limiting the present disclosure. In addition, features defined by "first" and "second" can explicitly instruct or impliedly include one or more features. In the description of the present invention, unless otherwise indicated, "plurality" means two or more.

In the description of the present invention, it should be also noted that unless otherwise explicitly defined and defined, the terms "mounted", "coupled" and "connected" shall be understood broadly, and may be, for example, fixedly connected, or detachably connected, or integrally connected, or mechanically connected, or electrically connected, or directly connected, or indirectly connected through an intermediate medium, or interconnection between two elements. Those of ordinary skill in the art can understand the specific meanings of the above terms in the present disclosure according to specific situations.

The present disclosure relates to a fan. The fan includes an oscillation angle adjustment device for a fan.

Other constituents and operations of the fan are known to those of ordinary skill in the art, and will not be described in detail here. The structure of the oscillation angle adjustment device for a fan will be described in detail below.

Referring to FIG. 1, FIG. 2, FIG. 3, FIG. 4, FIG. 5 and FIG. 17, the present disclosure relates to an oscillation angle adjustment device for a fan, including a motor (an alternating current motor 10 a direct current motor), a plastic gearbox housing 4, and a set of power transmission mechanism including a worm, a worm gear, a small gear of a worm gear shaft, and a large gear; a bearing sleeve positioning plate 17 is arranged between the small gear 28 of the worm gear shaft, and the large gear 32; a first inverted clasp 44 and a second inverted clasp 48 are arranged at a position of a bottom of the plastic gearbox housing 4 corresponding to an outer side of an addendum circle of the worm gear 27; a first clasp hole 15 and a second clasp hole 18 are arranged at a position of the bearing sleeve positioning plate 17 corresponding to the outer side of an addendum circle of the worm gear 27; and the first inverted clasp 44 and the second inverted clasp 48 at the bottom of the plastic gearbox housing 4 are pressed into the first clasp hole 15 and the second clasp hole 18 of the bearing sleeve positioning plate 17 to achieve inverted clasp-clasp hole fastening. Thus, a set of power transmission mechanism that is fixedly mounted in a screw-free manner is formed in the oscillation angle adjustment device for a fan of the present disclosure. The screw-free inverted clasp-clasp hole fixing manner is used for the bearing sleeve positioning plate 17 of the power transmission mechanism to replace a conventional screwing fixing technology in the prior art, so that screws are saved. During mounting, no tools are used. An operator presses the bearing sleeve positioning plate 17 to the inverted clasps with hands to complete fixing, which improves the working efficiency. More importantly, this essentially eliminates a potential hazard of a quality accident caused during general assembling of a fan after delivery because screws are occasionally left in a gearbox finished product.

Referring to FIG. 2, FIG. 5, FIG. 6, FIG. 7 and FIG. 8, a set of planetary gear train-crank mechanism composed of a sun gear 46, a plenary gear crank, a planetary frame 7 and a planetary shaft is arranged at a lower end of a mandrel 31 and a lower end of a hollow shaft 42; a circular arc reinforcing sleeve 8 is integrated on a lower end face of the planetary frame 7; a circular surface 58 of one end of the circular arc reinforcing sleeve is in sliding fit with a non-meshing portion of an addendum circle surface of the planetary gear 9; and another end of the circular arc reinforcing sleeve keeps a space with an addendum circle of the sun gear 46.

By means of the circular surface 58 of one end of the circular arc reinforcing sleeve integrated on the lower end face of the planetary frame 7 being in sliding fit with the planetary gear 9, and another end 55 of the circular arc reinforcing sleeve keeping a space with the sun gear 46, on the one hand, the semi-closed circular surface of one end of the circular arc reinforcing sleeve 8 can be used to restrain a single-ended cantilever structure of the planetary gear crank, to avoid dislocation. On the other hand, the addendum circle of the sun gear 46 is kept in an open clearance from another end 55 of the circular arc reinforcing sleeve, so that restricted extrusion damage from the planetary gear 9 to the sun gear 46 in the angle adjustment process is structurally eliminated, and the problem of braking of the sun gear 46 caused by the gyration of the planetary frame 7 and the circular arc reinforcing sleeve 8 is eliminated. Thus, a set of planetary gear train-crank mechanism in the oscillation angle adjustment device for a fan of the present disclosure is formed, which can eliminate reactive power loss during the angle adjustment, prolong the service lives of the three components of the planetary gear train-crank mechanism, and solve the problem of dislocation and slip of the single-ended cantilever structure of the planetary gear crank.

As a preferable structure of the planetary gear train-crank mechanism in the present disclosure, a gap 43 is formed in a lower end of the hollow shaft 42; a bump 30 is formed on a wall body of a hollow shaft sleeve hole of the planetary frame 7; wall surfaces of two sides of the bump 30 are fixedly clamped into the gap 43 of the hollow shaft 42; an arc radial wall surface 59 of the bump 30 passes through the gap 43 in the lower end of the hollow shaft 42 to be in sliding fit with a body of the mandrel 31. By means of the arc radial wall surface 59 of the bump 30 of the planetary frame 7 passing through the gap 43 in the lower end of the hollow shaft 42 to be in sliding fit with the body of the mandrel 31, the convenience of fixing the planetary frame 7 and the hollow shaft 42 is improved; the stability of contact with the circular surface during the gyration of the planetary frame 7 around the mandrel 31 in the angle adjustment process is also improved; a friction force of large-area gyration of the hollow shaft 42 and the mandrel 31 is also reduced; the reactive power consumption is reduced; and the service lives of the relevant components are prolonged.

As a preferable structure of the planetary gear train-crank mechanism in the present disclosure, the planetary shaft is a rivet 47; a counterbore 56 is formed in a lower end surface of a planetary gear shaft hole 45 of the planetary gear crank; a diameter of the counterbore 56 is greater than that of a head 57 of the rivet, and a sinking depth of the counterbore 56 is greater than a thickness of the head 57 of the rivet; a diameter of a planetary shaft hole 29 formed in the planetary frame 7 is less than that of a body of the rivet; the body of the rivet passes through the counterbore 56 of the planetary gear 9 and the planetary gear shaft hole 45 in a sliding fit manner, and is then pressed into the planetary shaft hole 29 of the planetary frame 7 in an interference fit manner to achieve fastening; and after fastening, a cascade end surface of the head 57 of the rivet and a bottom end surface of the counterbore 56 of the planetary gear are in sliding fit. By means of using a straight fixing solution of the rivet 47 to replace a two-stage planetary shaft fixing solution in the prior art and a composite bearing fixing solution in the related art, the material cost is reduced; the assembling technology is optimized; the production efficiency is improved; and the labor and material cost of the components of the planetary gear train-crank mechanism in the present disclosure is reduced.

As a preferable structure of the planetary gear train-crank mechanism in the present disclosure, a longitudinal reference convex bar 60 is arranged on an outer wall of the circular arc reinforcing sleeve 8; a longitudinal zero-setting convex bar 61 is arranged on a crank body of the planetary gear crank; and when an eccentric distance of the planetary gear crank is located at a reference origin closest to a center distance of the sun gear 46, the longitudinal zero-setting convex bar 61 of the planetary gear crank is longitudinally linearly aligned with the longitudinal reference convex bar 60 of the circular arc reinforcing sleeve 8. By the adoption of a zero-setting device of the planetary gear train-crank mechanism, the operation accuracy, reliability and convenience of the whole set of planetary gear train-crank mechanism in the present disclosure in the whole process of production, quality inspection and repair can be improved.

Referring to FIG. 2, FIG. 5, FIG. 9 and FIG. 10, a pawl seat 37, a pawl 34 and a bias spring 35 are arranged at an upper end of the mandrel 31; the large gear 32 is arranged at an upper end of the hollow shaft 42; a ratchet wheel 33 is concentrically integrated on an upper end face of the large gear 32, and an addendum circle is smaller than an addendum circle of the large gear 32; a profile of teeth of the ratchet wheel 33 is a non-involute tooth profile having a pressure angle greater than 30 degrees; and a cross section of a tooth 63 is trapezoid; and the pawl 34 abuts against the teeth of the ratchet wheel 33 with the non-involute tooth profile, to form a set of ratchet wheel-pawl clutch device. By means of rearranging the ratchet wheel-pawl clutch device, which has a pressure angle of greater than 30 degrees and has a non-involute tooth profile, on the upper end face of the large gear 32, an effective load of the ratchet wheel-pawl clutch device is much greater than that of a large gear-pawl clutch device which has a pressure angle of 0-25 degrees only and has an involute tooth profile in the prior art. Furthermore, a larger pressure angle indicates a higher effective load. In this way, the structural disadvantages of low effective load and easy slip of the large gear-pawl clutch device in the prior art can be overcome, thus forming a set of clutch device that does not slip in a normal case.

A control ratchet wheel 39 is arranged above the pawl seat 37; a via hole 38 is formed in the control ratchet wheel 39; a small cylinder 36 is arranged on the pawl 34 and can pass through the via hole 38 of the control ratchet wheel 39; a set of magnetic brake 24 with a brake ratchet 22 is arranged on an outer edge of the control ratchet wheel 39; and the magnetic brake device 24 is connected to an output end of an angle adjustment control chip 13 of a main control board through a wire 11, thus forming a set of electrically controlled clutch-brake operation mechanism.

Figure 2:
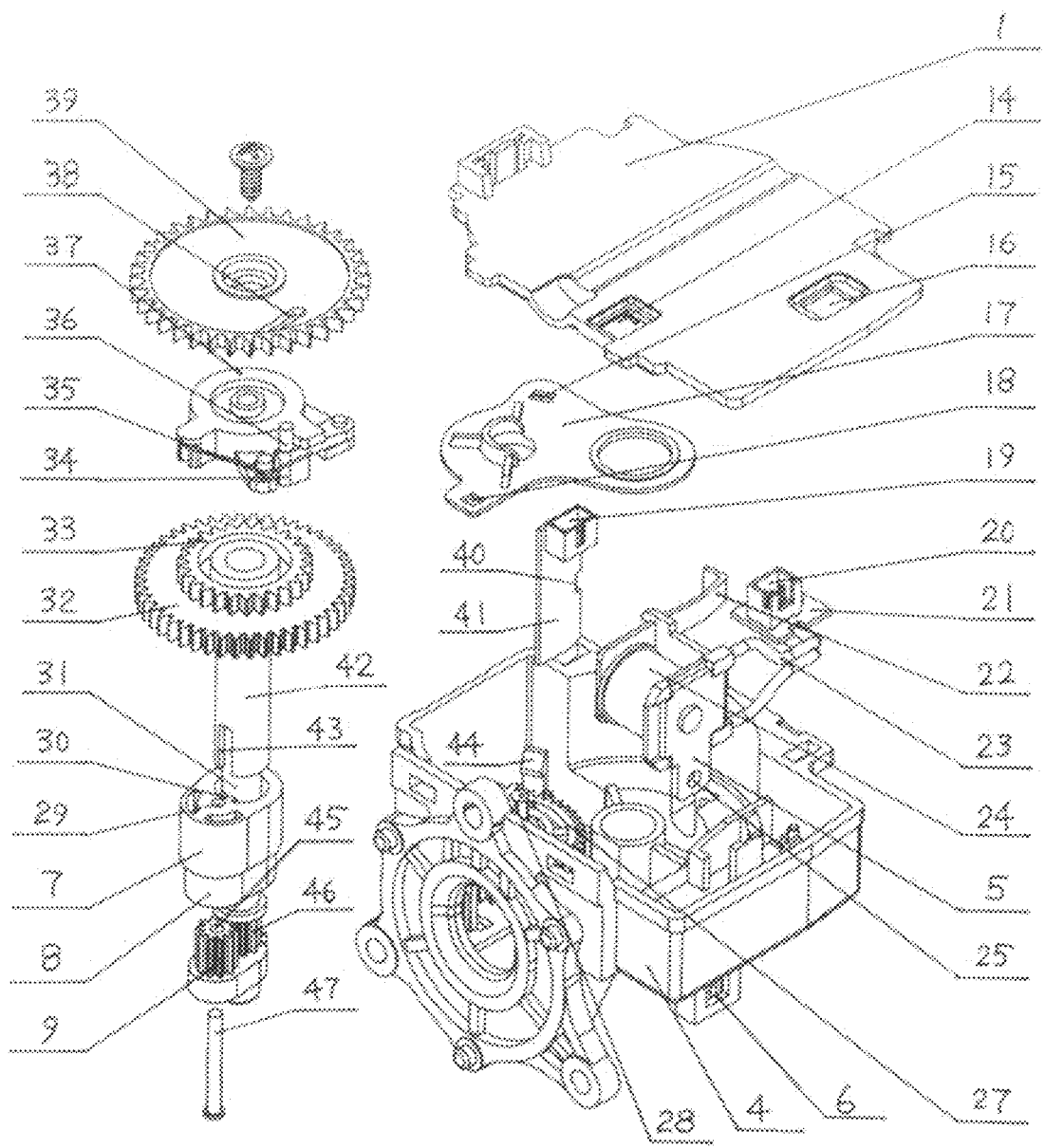
FIG. 2 is an exploded diagram of a gearbox in the embodiment of FIG. 1.
Figure 3:
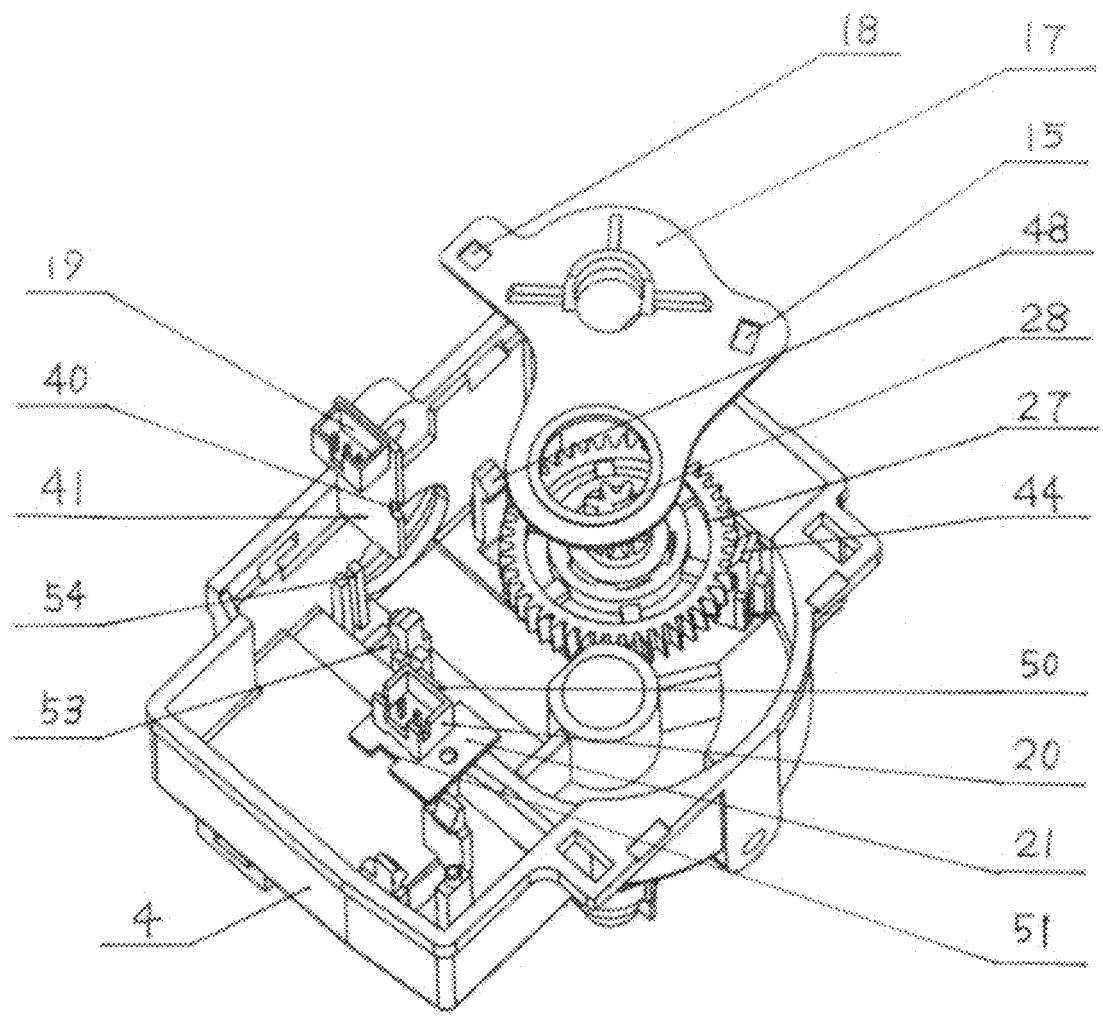
FIG. 3 is an internally partially exploded diagram of a gearbox in the embodiment of FIG. 1.
Figure 4:
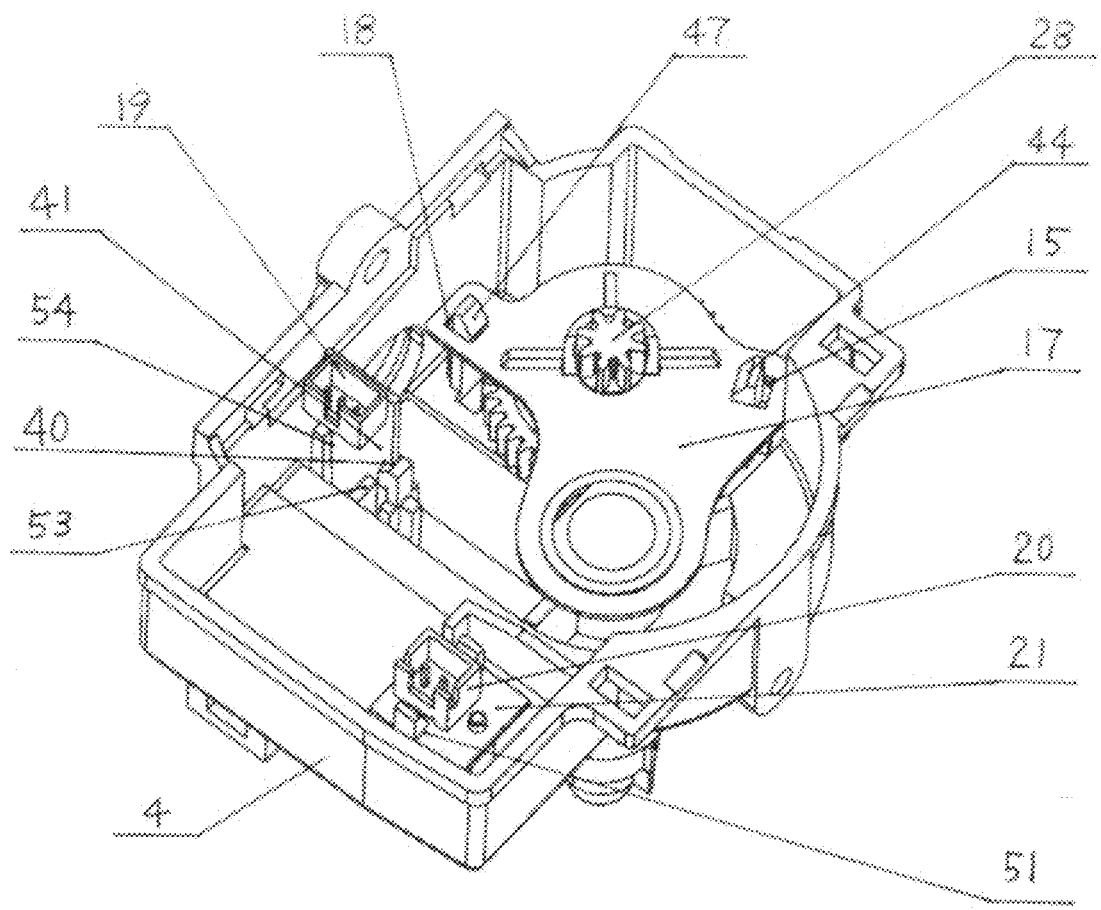
FIG. 4 is an internally partial view of a gearbox in the embodiment of FIG. 1.
Figure 11:
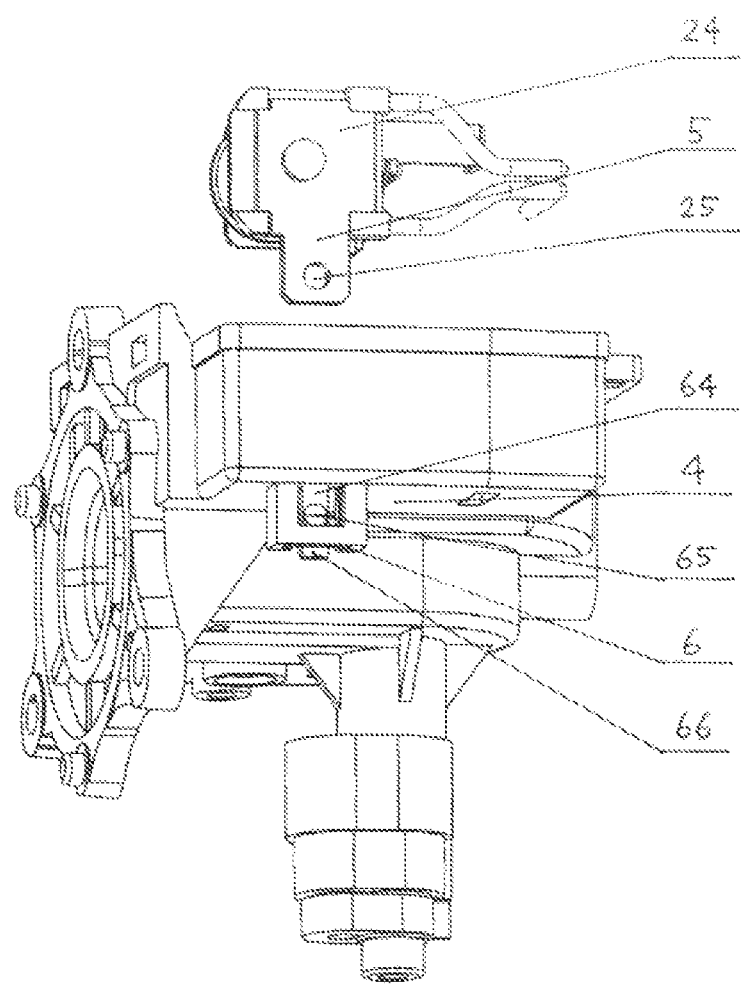
FIG. 11 is an externally partially exploded diagram of a gearbox in the embodiment of FIG. 1.
Figure 12:
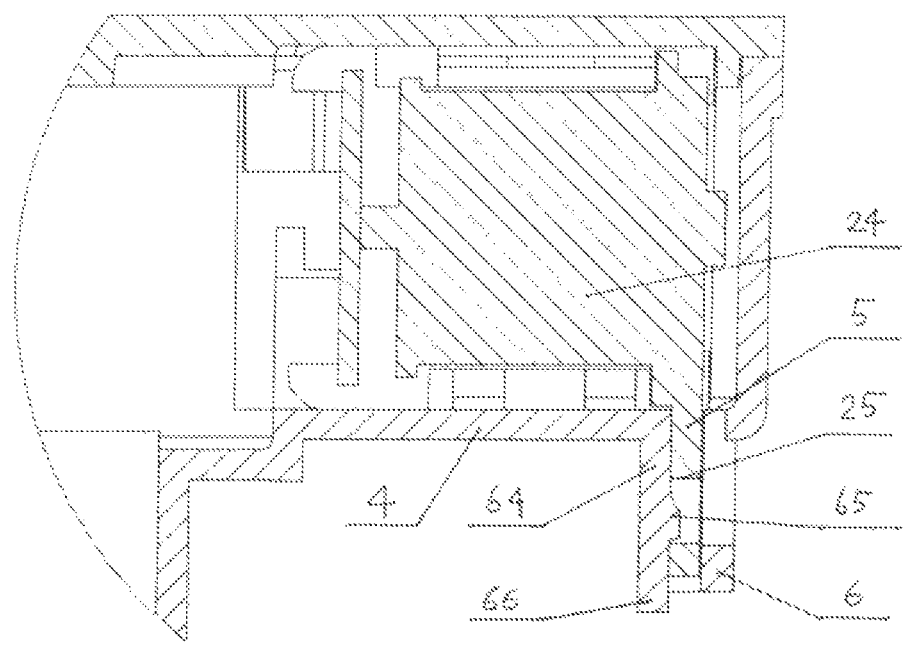
FIG. 12 is a partially enlarged sectional view of a gear box in the embodiment of FIG. 1 along a middle line of a through hole of a magnetic brake.
Figure 13:
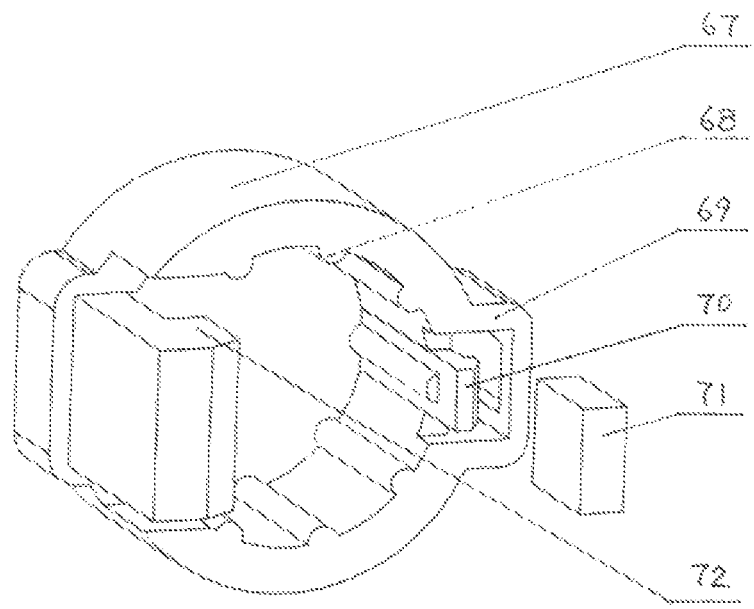
FIG. 13 is an exploded diagram of a magnetic sheet-plastic lantern ring in the embodiment of FIG. 1.
Figure 14:
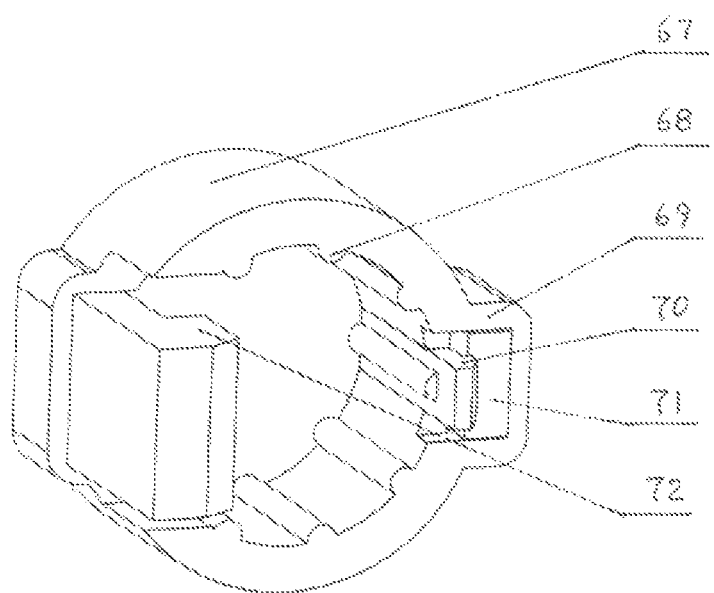
FIG. 14 is an external view of a magnetic sheet-plastic lantern ring assembling unit in FIG. 13.
Figure 15:
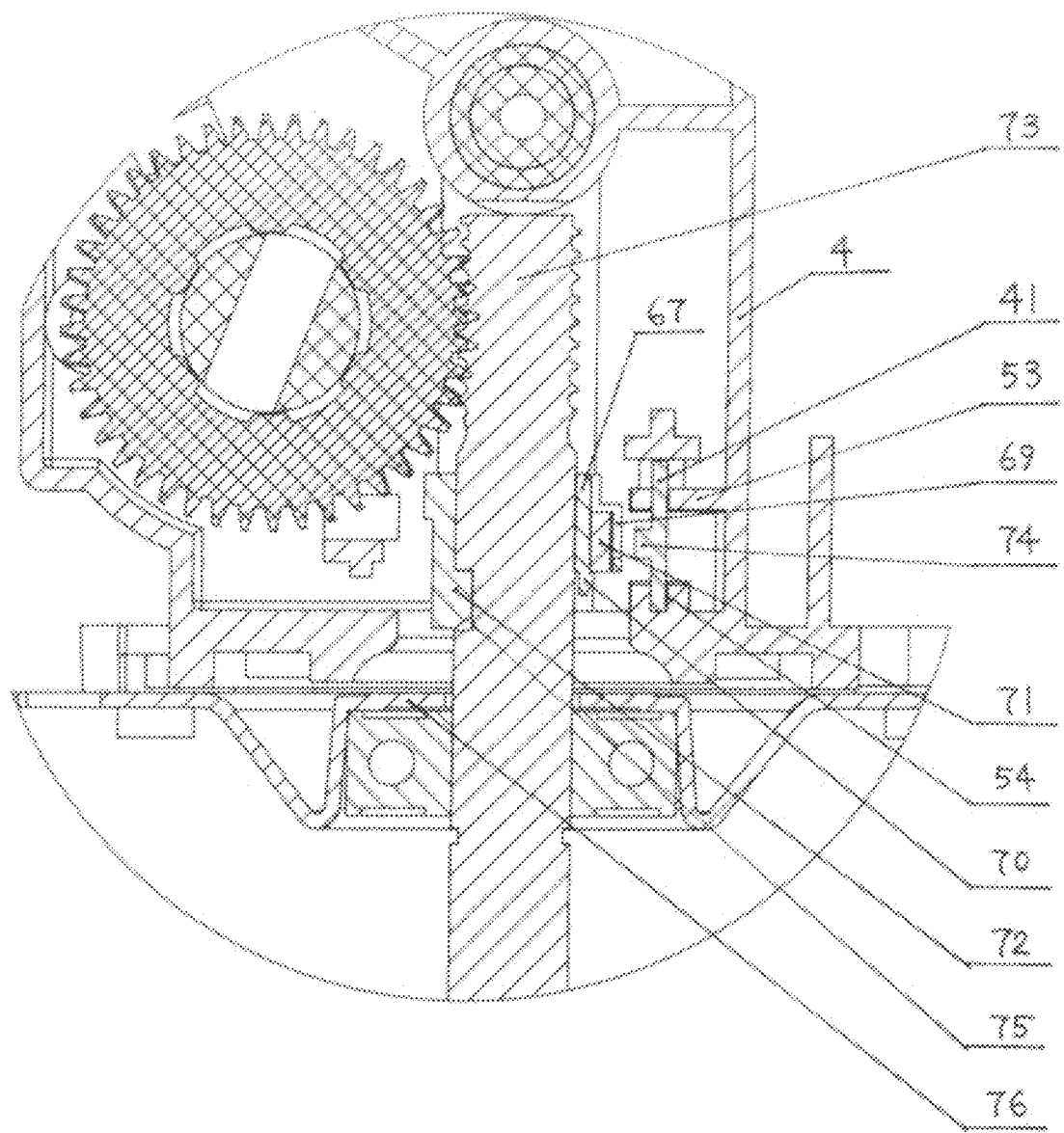
FIG. 15 is a transversely partially enlarged sectional view of the embodiment of FIG. 1.
Figure 16:
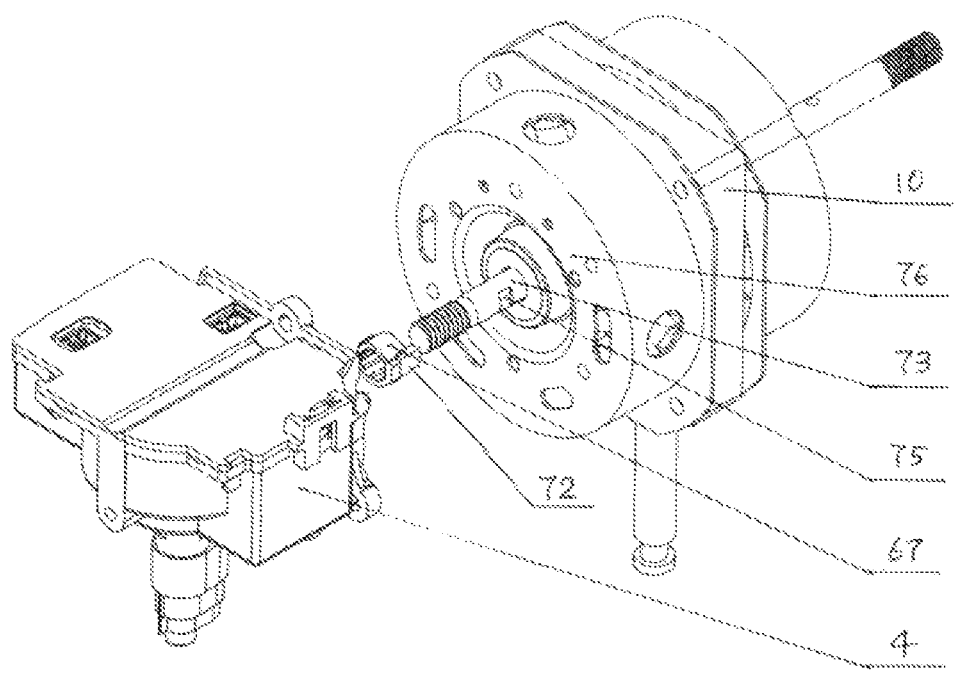
FIG. 16 is an exploded diagram of FIG. 1.

Referring to FIG. 2, FIG. 11 and FIG. 12, the plastic gearbox housing 4 is provided with a longitudinal open slot 6 at the bottom, located on another side of a middle line of the worm, of the power transmission mechanism including the worm, the worm gear, the small gear of the worm gear shaft, and the large gear; a longitudinal mounting plate 5 is arranged at the bottom of the magnetic brake 24; the longitudinal mounting plate 5 of the magnetic brake 24 is inserted into the longitudinal open slot 6 of the plastic gearbox housing 4 to achieve close contact, so that the magnetic brake 24 is plugged into the plastic gearbox housing 4 in a hidden manner; an inverted buckle 65 is arranged on a side wall 64 of the longitudinal open slot; a through hole 25 is formed in the longitudinal mounting plate 5; and the through hole 25 of the longitudinal mounting plate 5 is inserted into the longitudinal open slot 6 along with the longitudinal mounting plate 5 to achieve inverted buckle-through hole clamping contact with the inverted buckle 65 on the side wall 64 of the longitudinal open slot. Thus, the magnetic brake 24 can be fixed in the plastic gearbox housing 4 with bare hands, without screws and tools. On the one hand, the labor and material cost of the conventional screwing technology for mounting the magnetic brake 24 in the prior art and the potential hazard that screws are left in a gearbox can be eliminated. On the other hand, according to the optimized structure, the magnetic brake 24 is arranged at the bottom opposite to the plastic gearbox housing 4 in the hidden manner, instead of being mounted on the side wall of the gearbox housing 4, so that the assembling space is reduced, and the violation defect that the magnetic brake 24 is exposed from the side wall of the gearbox housing 4 is avoided.

In order to facilitate machining and repair of the magnetic brake 24, the through hole 25 of the longitudinal mounting plate 5 of the above magnetic brake 24 is a round through hole, and the inverted buckle 65 on the side wall 64 of the longitudinal open slot of the above plastic gearbox housing 4 is a round inverted buckle. An extension plate 66 is formed at a lower end of the round inverted buckle and extends out of the bottom end face of the longitudinal open slot 6. By adoption of the round through hole-round inverted buckle-extension plate structure, it is convenient to fix the magnetic brake with only hands. When the magnetic brake 24 needs to be removed, no driver tool is used, and an operator can slightly press the extension plate 66 with a finger to press the round inverted buckle away from the round through hole of the longitudinal mounting plate, to push the magnetic brake 24 out, which is convenient for repair.

Referring to FIG. 2, FIG. 3, FIG. 4, FIG. 11 and FIG. 12, a support-inverted clasp is arranged at a position of the plastic gearbox housing 4 close to an outgoing line 23 of the magnetic brake; the outgoing line 23 of the magnetic brake is connected to a magnetic trunking circuit board 21 and is connected with a magnetic trunking socket 20 on the board; a fourth clasp hole 50 and a fifth clasp hole 51 are formed in the magnetic trunking circuit board 21; and the fourth clasp hole 50 and the fifth clasp hole 51 of the magnetic trunking circuit board 21 are pressed into the support-inverted clasp of the plastic gearbox housing 4 to achieve inverted clasp-clasp hole fastening. Referring to FIG. 1, a wire 11 of the angle adjustment control chip is provided with a magnetic trunking plug 3; and the magnetic trunking plug 3 is connected to the magnetic trunking socket 20 in a trunking plugging manner. By means of the outgoing line 23 of the magnetic brake being connected to the magnetic trunking circuit board 21 and the magnetic trunking socket 20, the magnetic brake is fixed in the plastic gearbox housing 4 in an inverted clasp-clasp hole screw-free manner, so that an electrical control system is compact in configuration and convenient to mount, thereby forming a set of electrically controlled clutch-brake operation mechanism that complies with the production and operation regulations in the fan industry.

A main power motor for air blowing and oscillation of the existing fan can be an alternating current motor or a direct current permanent magnet brushless motor. Due to different types of main power motors of the fan, an electrical signal sampling system in the oscillation angle adjustment device of a fan separately can separately adopt a corresponding electrical signal sampling system of the alternating current motor or a corresponding electrical signal sampling system of the direct current permanent magnet brushless motor.

Referring to FIG. 1, FIG. 2, FIG. 3, FIG. 4, FIG. 13, FIG. 14, FIG. 15 and FIG. 16, when the main power motor of the fan is an alternating current motor 10, in the corresponding electrical signal sampling system of the alternating current motor, the motor is an alternating current motor 10. A planar gap 75 is axially formed in a rotor shaft body 73, extending out of a housing 76 of the motor, of the rotor of the alternating current motor 10; the permanent magnet is a magnetic sheet 71; a plastic lantern ring 67 is arranged between the rotor shaft body 73 extending out of the housing 76 and the magnetic sheet 71; a magnet sleeving box 69 is arranged on an outer wall of the plastic lantern ring 67; a third inverted clasp 70 is arranged at an inlet of the magnet sleeving box 69; the magnetic sheet 71 presses, from the inlet of the magnet sleeving box 69, the third inverted clasp 70 to be inserted into the magnet sleeving box 69, to achieve fastening with the third inverted clasp 70, to form a set of magnetic sheet-plastic lantern ring assembling unit; seven circular arc convex bars 68 are arranged on an inner wall of the plastic lantern ring 67; circular surfaces of the circular arc convex bars 68 are in sliding fit and contact with the rotor shaft body 73 extending out of the housing 76; a transverse clamping type clasp bump 72 is axially arranged on a wall body of the plastic lantern ring 67; and the transverse clamping type clasp bump 72 slides into the planar gap 75 of the rotor shaft body 73 along with the plastic lantern ring 67 to achieve transverse clamping and fixing.

The magnetic sheet 71 is plugged into the magnet sleeving box 69 of the plastic lantern ring 67 to form a set of elastic magnetic sheet-plastic lantern ring assembling unit, so that the assembling unit can sleeve a rotor shaft body 73 in a sliding manner from a rear end of the rotor shaft body 73 of the alternating current motor 10 extending out of the housing 76. Furthermore, the transverse clamping type clasp bump 72 on the wall body of the plastic lantern ring 67 is used to be clamped to the planar gap 75 of the rotor shaft body 73, which solves an assembling problem: Since the rotor of the alternating current motor 10 rotates at a high speed, a centrifugal force generated on a surface of the rotor shaft body 73 and the characteristic of a thermal expansion and cold contraction stress cause the magnetic sheet 71 to move and even fly out. This screw-free and glue-free sliding-mounting method is compatible with the industrial production technology and has the advantages of high efficiency and low cost. Therefore, sleeving the rotor shaft body 73 of the alternating current motor 10 extending out of the housing 76 by the magnetic sheet-plastic lantern ring assembling unit establishes a basis for low- and high-voltage isolation of a hall sensor 74.

In the corresponding electrical signal sampling system of the alternating current motor used in the present disclosure, the rotor position sensing signal acquisition device is a hall sensor 74; the hall sensor 74 is mounted on an electrical signal trunking circuit board 41 and is connected to an electrical signal trunking socket 19 fixedly arranged to the electrical signal trunking circuit board 41; a third clasp hole 40 is formed in a side edge of the electrical signal trunking circuit board 41; a longitudinal clamping plate slot 54, a clamping plate bar 53 and a baffle plate-inverted clasp are arranged in the plastic gearbox housing 4; the electrical signal trunking circuit board 41 and the third clasp hole 40 thereof are plugged into the longitudinal clamping plate slot 54, the clamping plate bar 53 and baffle plate-inverted clasp of the plastic gearbox housing 4 from top to bottom, to achieve inverted clasp-clasp hole plugged fastening and fixing; after plugging and fixing, the hall sensor 74 on the electrical signal trunking circuit board 41 is located in the plastic gearbox housing 4, and corresponds to a radial clearance at the magnetic sheet 71 position of the magnetic sheet-plastic lantern ring assembling unit on the planar gap 75 of the rotor shaft body 73, extending out of the housing 76, of the alternating current motor 10; the wire 12 of the angle adjustment control chip is provided with an electrical signal trunking plug 2; and the electrical signal trunking plug 2 is connected to the electrical signal trunking socket 19 in a trunking plugging manner. By such a structure, the hall sensor 74 can be arranged in the plastic gearbox housing 4 that isolates a high-voltage environment, thus forming a set of alternating current motor 10 electrical signal sampling device, in which low- and high-voltage elements are isolated. The electrical signal trunking plug 2 arranged on the wire 12 of the angle adjustment control chip is connected to the electrical signal trunking socket 19 in the trunking plugging manner, to form the electrical signal sampling system of the alternating current motor of the present disclosure. The system is compatible with the industrial mounting technology.

In the angle adjustment process, the electrical signal sampling system of the alternating current motor inputs a real-time detected electrical signal sampling value associated with and corresponding to a gyration action trajectory of the planetary gear crank into the angle adjustment control chip 13. By calculation, the magnetic brake 24 is controlled to be energized to be closed, and the brake ratchet 22 blocks the control ratchet wheel 39; the ratchet wheel-pawl clutch device is turned on to drive the planetary gear crank to gyrate to enter an angle adjustment state; when a difference between the electrical signal sampling value and a given value is zero, the angle adjustment control chip 13 sends a power-off instruction; the brake ratchet 22 of the magnetic brake 24 releases the control ratchet wheel, and the clutch device is closed; and the planetary gear crank is locked into an ordinary gear train according to a new set value. Thus, the alternating current fan oscillates to blow air according to a new oscillation angle range, to form the closed-loop electrically controlled oscillation angle adjustment device of the alternating current fan. The operation principle and path of the closed-loop electrically controlled oscillation angle adjustment device of the alternating current fan are publicly known technologies, and will not be described in detail.

Figure 5:
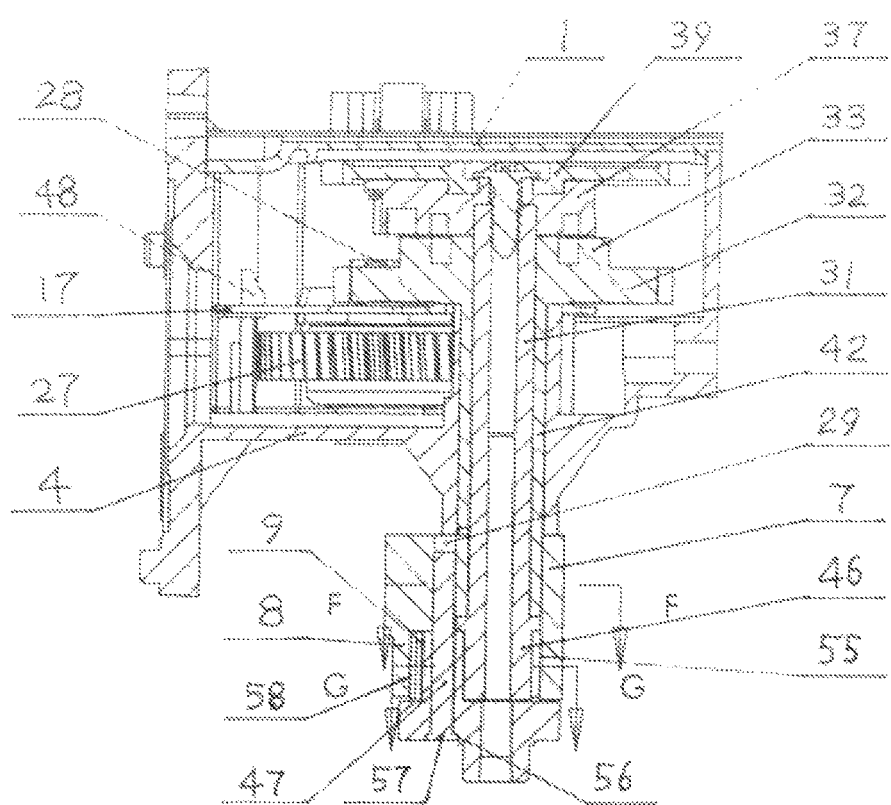
FIG. 5 is a longitudinal sectional view of a gearbox in the embodiment of FIG. 1.
Figure 6:
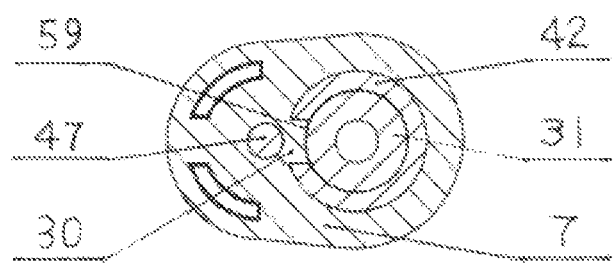
FIG. 6 is a transverse sectional view along the line F-F in FIG. 5.
Figure 7:
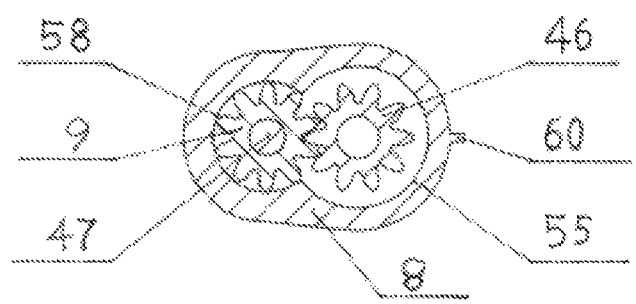
FIG. 7 is a transverse sectional view along the line G-G in FIG. 5.
Figure 8:
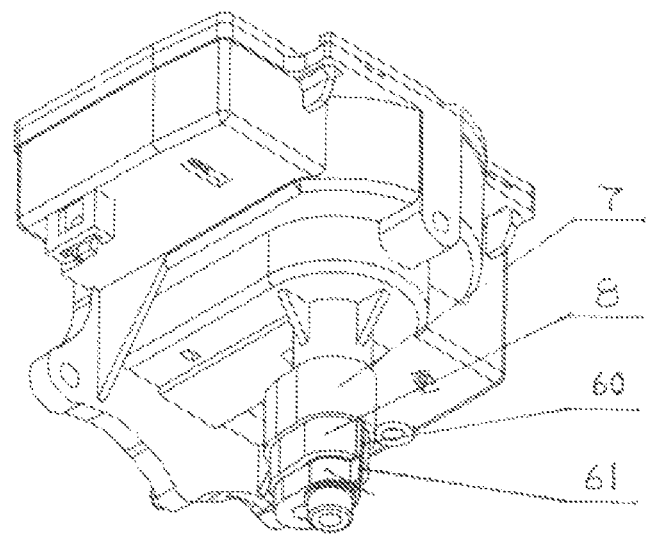
FIG. 8 is an external view of a gearbox in the embodiment of FIG. 1.
Figure 9:
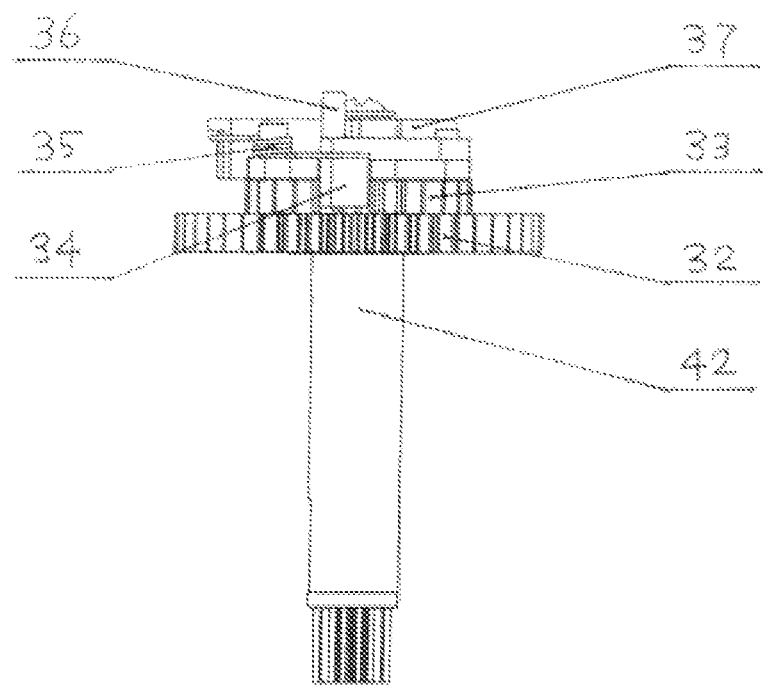
FIG. 9 is a right view of a ratchet wheel-pawl clutch device in FIG. 5.
Figure 10:
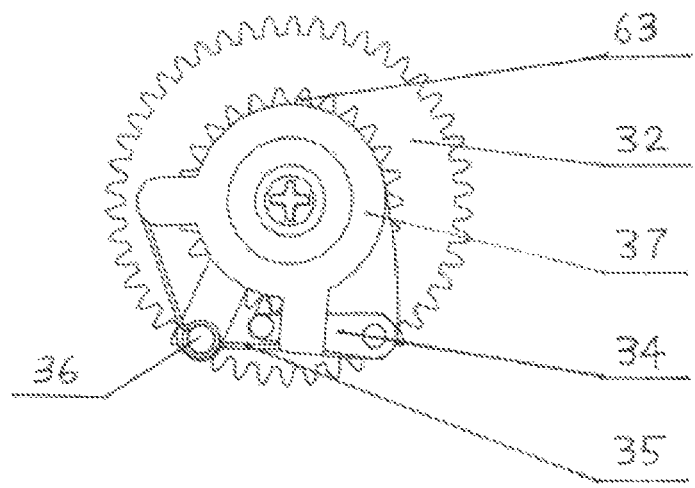
FIG. 10 is a top view of a ratchet wheel-pawl clutch device in FIG. 5.

Referring to FIG. 1, FIG. 2 and FIG. 5, a cover plate 1 is arranged on the plastic gearbox housing 4; the cover plate 1 is provided with a second opening 16 and a first opening 14 in positions corresponding to the magnetic trunking socket 20 and the electrical signal trunking socket 19; and the cover plate 1 covers all components in the plastic gearbox housing 4, to achieve fastening combination with the plastic gearbox housing 4. In such a fastening manner by the cover plate structure reserved with the openings, a complete housing protection can be provided for the oscillation angle adjustment device product of a fan, which complies with the safety regulations and meets the industry regulations.

Figure 17:
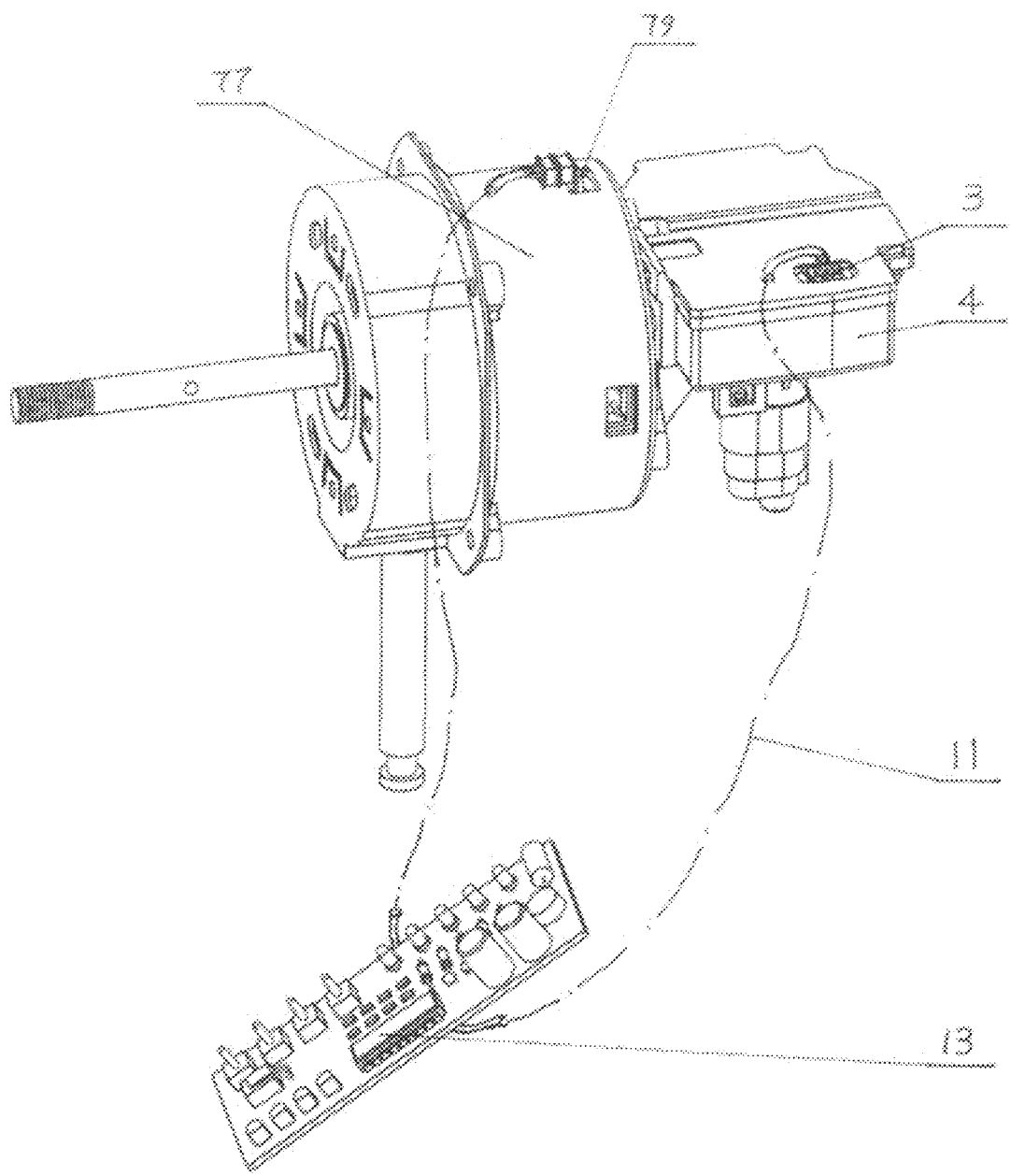
FIG. 17 is a schematic diagram of general arrangement of a direct current fan embodiment of an oscillation angle adjustment device for a fan of the present disclosure.
Figure 18:
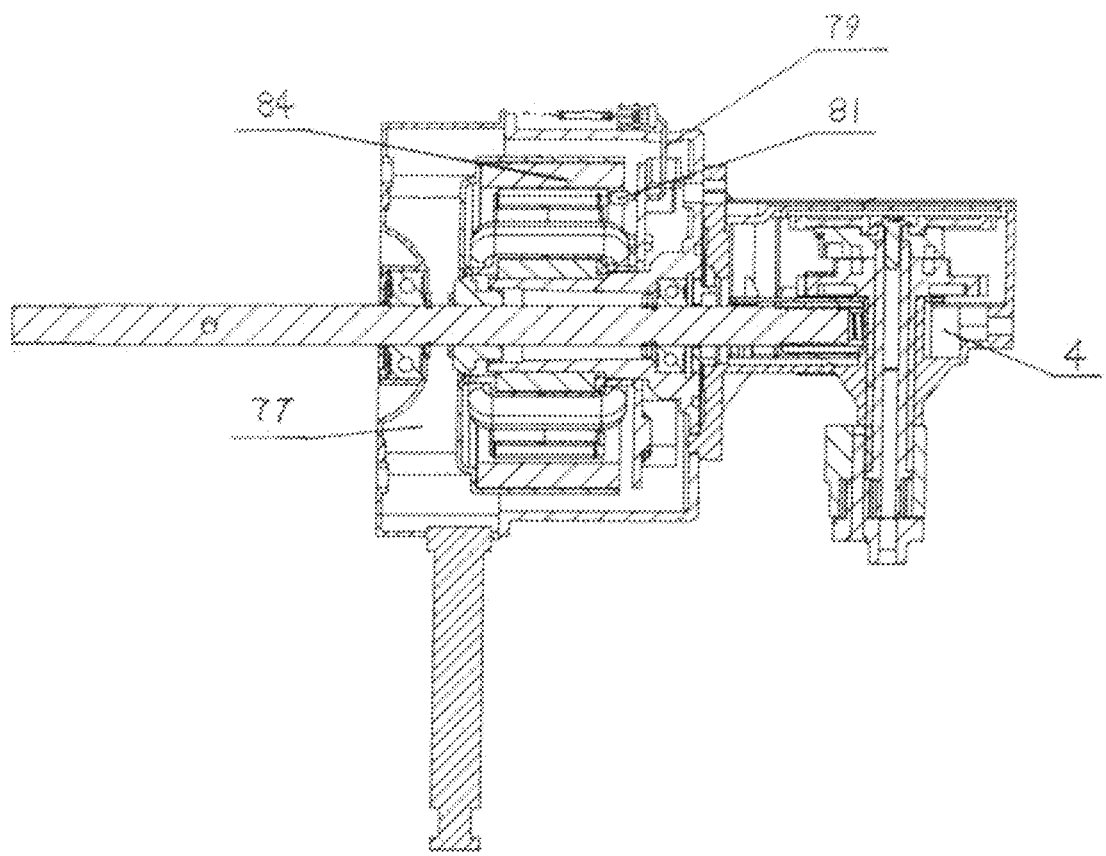
FIG. 18 is an enlarged sectional diagram of a motor in FIG. 17.

Referring to FIG. 17 and FIG. 18, a direct current fan embodiment with the oscillation angle adjustment device for a fan of the present disclosure is shown. When the main power motor of the direct current fan is a 12v direct current permanent magnet brushless motor 77, in the oscillation angle adjustment device of the direct current fan of the present disclosure, the remaining mechanisms are basically the same except that the corresponding electrical signal sampling system of the 12v direct current permanent magnet brushless motor 77 is different from the electrical signal sampling system of the alternating current fan. In the electrical signal sampling system of the 12v direct current permanent magnet brushless motor 77 of the present disclosure, the motor is the 12v direct current permanent magnet brushless motor 77; the permanent magnet 84 is an existing permanent magnet of the rotor of the 12v direct current permanent magnet brushless motor; the rotor position sensing signal acquisition device is an existing hall sensor 81 of the 12v direct current permanent magnet brushless motor; and an existing electrical signal wire 79 of the existing hall sensor 81 of 12v direct current permanent magnet brushless motor is connected to the input end of the angle adjustment control chip 13 via a connecting line.

The 12v direct current permanent magnet brushless motor 77 does not have a direct current low voltage inside to break down an electrical environment of the existing hall sensor 81 of the 12v direct current permanent magnet brushless motor, so that the electrical signal sampling system of the 12v direct current permanent magnet brushless motor 77 in the present disclosure can be formed as long as the connecting line connected to the input end of the angle adjustment control chip 13 is additionally arranged at an output end of the electrical signal wire 79 of the existing hall sensor 81 of the 12v direct current permanent magnet brushless motor. It can be understood that in order to avoid the interference caused by repeated arrangement, no planar gap 75 will be formed in the rotor shaft body of the 12v direct current permanent magnet brushless motor 77 extending out of the housing, and the magnetic sheet-plastic lantern ring assembling unit will not be required either. A space is reserved in the longitudinal clamping plate slot 54, the clamping plate bar 53 and baffle plate-inverted clasp of the above plastic gearbox housing 4, and the electrical trunking circuit board 41, and the hall sensor 74 and the electrical trunking socket 19 on the board are not plugged; and no electrical signal trunking socket opening will not be formed in the cover plate. Therefore, the electrical signal sampling system of the 12v direct current permanent magnet brushless motor 77 is connected to the input end of the angle adjustment control chip 13, and the output end of the angle adjustment control chip 13 is connected to the magnetic brake 24, to form a closed-loop electrically controlled oscillation angle adjustment device of a fan with the 12v direct current permanent magnet brushless motor, so that the planetary gear train-crank can be operated to be adjusted according to a new set value to achieve automatic adjustment of an oscillation angle of the direct current fan. The adjustment path and principle of the closed-loop electrically controlled planetary gear train-crank have been described in the technical solution of the alternating current fan, and will not be repeated here.

Of course, in the oscillation angle adjustment device for a fan of the present disclosure, a specific clearance between another end of the circular arc reinforcing sleeve integrated on the lower end face of the planetary frame and the addendum circle of the sun gear is not limited to a circular arc clearance of another end shown in the above embodiment greater than a radius of the addendum circle of the sun gear, a rectangular clearance of another end greater than a diameter of the addendum circle of the sun gear, a specially-shaped clearance of another end greater than a diameter of the addendum circle of the sun gear to facilitate machine, or a vacant open clearance of another end from the non-meshing portion of the addendum circle of the sun gear. These partial transformations of the clearance between another end of the circular arc reinforcing sleeve and the addendum circle of the sun gear all fall within the protection scope of the present disclosure. Obviously, the above embodiments are only part of the embodiments of the present disclosure, rather than all the embodiments. Based on the embodiments of the present disclosure, all other embodiments obtained by those of ordinary skill in the art without creative work belong to the protection scope of the present disclosure.

The invention claimed is:

1. An oscillation angle adjustment device for a fan, comprising a motor, a plastic gearbox housing, and a set of power transmission mechanism comprising a worm, a worm gear, a small gear of a worm gear shaft, and a large gear, wherein a bearing sleeve positioning plate is arranged between the small gear of the worm gear shaft and the large gear; a set of planetary gear train-crank mechanism composed of a sun gear, a planetary gear crank, a planetary frame and a planetary shaft is arranged at a lower end of a mandrel and a lower end of a hollow shaft; a pawl seat, a pawl and a bias spring are arranged at an upper end of the mandrel; a clutch-brake control mechanism composed of a control ratchet wheel is arranged above the pawl seat; the plastic gearbox housing is provided with a magnetic brake; the magnetic brake is connected to an output end of an angle adjustment control chip through a first wire; a rotor of the motor is provided with a permanent magnet; a rotor position sensing signal acquisition device is arranged in a corresponding clearance of the permanent magnet; the rotor position sensing signal acquisition device is connected to an input end of the angle adjustment control chip through a second wire; a lower end face of the planetary frame is integrated with a circular arc reinforcing sleeve; a circular surface of one end of the circular arc reinforcing sleeve is in sliding fit with a non-meshing portion of an addendum circle surface of the planetary gear; and another end of the circular arc reinforcing sleeve keeps a space with an addendum circle of the sun gear.

2. The oscillation angle adjustment device according to claim 1, wherein the planetary shaft is a rivet; a counterbore is formed in a lower end face of a planetary gear shaft hole of the planetary gear crank; a diameter of the counterbore is greater than a diameter of a head of the rivet, and a sinking depth of the counterbore is greater than a thickness of the head of the rivet; a diameter of a planetary shaft hole formed in the planetary frame is less than a diameter of a body of the rivet; the body of the rivet passes through the counterbore of the planetary gear and the planetary gear shaft hole in a sliding fit manner, and is then pressed into the planetary shaft hole of the planetary frame in an interference fit manner to achieve fastening; and after fastening, a cascade end face of the head of the rivet and a bottom end face of the counterbore of the planetary gear are in sliding fit.

3. The oscillation angle adjustment device according to claim 1, wherein a first inverted clasp and a second inverted clasp are arranged at a position of a first bottom of the plastic gearbox housing corresponding to an outer side of an addendum circle of the worm gear; a first clasp hole and a second clasp hole are arranged at a position of the bearing sleeve positioning plate corresponding to the outer side of the addendum circle of the worm gear; and the inverted clasps at the first bottom of the plastic gearbox housing are pressed into the clasp holes of the bearing sleeve positioning plate to achieve inverted clasp-clasp hole fastening.

4. The oscillation angle adjustment device according to claim 1, wherein the ratchet wheel is concentrically integrated on an upper end face of the large gear, and an addendum circle of the ratchet wheel is smaller than an addendum circle of the large gear; a profile of teeth of the ratchet wheel is a non-involute tooth profile having a pressure angle greater than 30 degrees; and a cross section of the teeth is triangular, trapezoid, rectangular, or other non-involute shapes convenient for machining; the pawl abuts against the teeth of the ratchet wheel to form a set of ratchet wheel-pawl clutch device.

5. The oscillation angle adjustment device according to claim 1, wherein the plastic gearbox housing forms a longitudinal open slot at a second bottom located on a side of a middle line of the worm of the power transmission mechanism; a longitudinal mounting plate is formed at a bottom of the magnetic brake; and the longitudinal mounting plate of the magnetic brake is inserted into the longitudinal open slot of the plastic gearbox housing to achieve close contact.

6. The oscillation angle adjustment device according to claim 5, wherein an inverted buckle is formed on a side wall of the longitudinal open slot; a through hole is formed in the longitudinal mounting plate; the through hole of the longitudinal mounting plate is inserted into the longitudinal open slot to achieve inverted buckle-through hole clamping contact with the inverted buckle.

7. The oscillation angle adjustment device according to claim 6, wherein the through hole is a round through hole; the inverted buckle is a round inverted buckle; and an extension plate extending out of a bottom end face of the longitudinal open slot is formed at a lower end of the round inverted buckle.

8. The oscillation angle adjustment device according to claim 1, wherein a support-inverted clasp is arranged at a position of the plastic gearbox housing close to an outgoing line of the magnetic brake; the outgoing line of the magnetic brake is connected to a magnetic trunking circuit board and is connected with a magnetic trunking socket on the board; a fourth clasp hole and a fifth clasp hole are formed in the magnetic trunking circuit board; and the fourth clasp hole and the fifth clasp hole of the magnetic trunking circuit board are pressed into the support-inverted clasp of the plastic gearbox housing to achieve inverted clasp-clasp hole fastening; the first wire is provided with a magnetic trunking plug; and the magnetic trunking plug is connected to the magnetic trunking socket in a trunking plugging manner.

9. The oscillation angle adjustment device according to claim 8, wherein the motor is an alternating current motor, a planar gap is axially formed in a rotor shaft body, extending out of a housing of the motor, of the rotor of the alternating current motor; the permanent magnet is a magnetic sheet; a plastic lantern ring is arranged between the rotor shaft body extending out of the housing of the motor and the magnetic sheet; a magnet sleeving box is arranged on an outer wall of the plastic lantern ring; a third inverted clasp is arranged at an inlet of the magnet sleeving box; the magnetic sheet presses, from the inlet of the magnet sleeving box, the third inverted clasp to be inserted into the magnet sleeving box, to achieve fastening with the third inverted clasp, to form a set of magnetic sheet-plastic lantern ring assembling unit; at least two or more circular arc convex bars are formed on an inner wall of the plastic lantern ring; circular surfaces of the circular arc convex bars are in sliding fit and contact with the rotor shaft body extending out of the housing of the motor; a transverse clamping type clasp bump is axially arranged on a wall body of the plastic lantern ring; and the transverse clamping type clasp bump slides into the planar gap of the rotor shaft body along with the plastic lantern ring to achieve transverse clamping and fixing.

10. The oscillation angle adjustment device according to claim 9, wherein the rotor position sensing signal acquisition device is a hall sensor; the hall sensor is mounted on an electrical signal trunking circuit board and is connected to an electrical signal trunking socket fixedly arranged to the electrical signal trunking circuit board; a third clasp hole is formed in a side edge of the electrical signal trunking circuit board; a longitudinal clamping plate slot, a clamping plate bar and a baffle plate-inverted clasp are formed in the plastic gearbox housing; the electrical signal trunking circuit board and the third clasp hole thereof are plugged into the longitudinal clamping plate slot, the clamping plate bar and the baffle plate-inverted clasp of the plastic gearbox housing from top to bottom, to achieve inverted clasp-clasp hole plugged fastening and fixing; after plugging and fixing, the hall sensor on the electrical signal trunking circuit board is located in the plastic gearbox housing, and corresponds to a radial clearance at the magnetic sheet position of the magnetic sheet-plastic lantern ring assembling unit on the gap of the rotor shaft body, extending out of the housing, of the alternating current motor; the second wire is provided with an electrical signal trunking plug; and the electrical signal trunking plug is connected to the electrical signal trunking socket in a trunking plugging manner.

11. The oscillation angle adjustment device according to claim 10, wherein a cover plate is arranged on the plastic gearbox housing; the cover plate forms a first opening and a second opening in positions corresponding to the magnetic trunking socket and the electrical signal trunking socket; and the cover plate covers all components in the plastic gearbox housing, to achieve fastening combination with the plastic gearbox housing.

12. The oscillation angle adjustment device according to claim 1, wherein the motor is a direct current permanent magnet brushless motor; the permanent magnet is an existing permanent magnet of the rotor of the direct current permanent magnet brushless motor; the rotor position sensing signal acquisition device is an existing hall sensor or an existing positionless sensing technology device of the direct current permanent magnet brushless motor; and an existing electrical signal wire of the hall sensor or an existing electrical signal wire of the positionless sensing technology device is connected to the input end of the angle adjustment control chip via the second wire.

13. A fan, comprising the oscillation angle adjustment device according to claim 1.

* * * * *